United States Patent
Myokan

(10) Patent No.: US 10,846,826 B2
(45) Date of Patent: Nov. 24, 2020

(54) IMAGE PROCESSING DEVICE AND IMAGE PROCESSING METHOD

(71) Applicant: SONY CORPORATION, Tokyo (JP)

(72) Inventor: Yoshihiro Myokan, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 2 days.

(21) Appl. No.: 16/089,822

(22) PCT Filed: Jan. 16, 2017

(86) PCT No.: PCT/JP2017/001198
§ 371 (c)(1),
(2) Date: Sep. 28, 2018

(87) PCT Pub. No.: WO2017/175441
PCT Pub. Date: Oct. 12, 2017

(65) Prior Publication Data
US 2019/0139197 A1    May 9, 2019

(30) Foreign Application Priority Data

Apr. 6, 2016 (JP) .................................. 2016-076571

(51) Int. Cl.
*G06K 9/00* (2006.01)
*G06T 5/00* (2006.01)
(Continued)

(52) U.S. Cl.
CPC ............ *G06T 5/002* (2013.01); *G06K 9/6212* (2013.01); *G06K 9/6215* (2013.01); *G06T 1/00* (2013.01);
(Continued)

(58) Field of Classification Search
CPC .... G06K 9/6212; G06K 9/6215; G06T 5/002; G06T 1/00; G06T 5/50;
(Continued)

(56) References Cited

U.S. PATENT DOCUMENTS

2007/0273686 A1* 11/2007 Watanabe ............. G06T 15/506
                                                         345/419
2009/0022396 A1*  1/2009 Watanabe ............ G06K 9/4633
                                                         382/167
(Continued)

FOREIGN PATENT DOCUMENTS

JP        04-329481 A     11/1992
JP        2006-185033 A    7/2006
(Continued)

OTHER PUBLICATIONS

International Search Report and Written Opinion of PCT Application No. PCT/JP2017/001198, dated Apr. 11, 2017, 06 pages of ISRWO.

*Primary Examiner* — Marceau Milord
(74) *Attorney, Agent, or Firm* — Chip Law Group

(57) ABSTRACT

An input image information generation processing section 21 generates depth distribution feature information in accordance with the pixel value and depth value of a pixel in a peripheral region with respect to a pixel of interest of an input image. A previous image information generation processing section 24 regards the pixel position of a pixel of interest in a previous image, which is an image earlier than the input guide image, as a corresponding pixel, and generates depth distribution feature information in accordance with the pixel value of the pixel of interest and the pixel value and depth value of a pixel in a previous image peripheral region with respect to the corresponding pixel. A merge control section 25 sets a merge ratio in accordance with the amount of pixel information difference between the pixel of interest and the corresponding pixel. A depth value setting section 26 merges the depth distribution feature information generated by the input image information generation processing section 21 with the depth distribution feature information generated by the previous image infor- (Continued)

mation generation processing section 24 at the merge ratio set by the merge control section 25, calculates a representative depth value from the merged depth distribution feature information, and regards the calculated representative depth value as the depth value of the pixel of interest. Spatiotemporal stability of a depth image can be improved.

15 Claims, 16 Drawing Sheets

(51) Int. Cl.
    *G06T 1/00*     (2006.01)
    *G06K 9/62*     (2006.01)
    *G06T 5/50*     (2006.01)

(52) U.S. Cl.
    CPC ...... *G06T 5/50* (2013.01); *G06T 2207/10024* (2013.01); *G06T 2207/10028* (2013.01); *G06T 2207/20072* (2013.01); *G06T 2207/20221* (2013.01)

(58) Field of Classification Search
    CPC .......... G06T 2207/10024; G06T 2207/10028; G06T 2207/20072; G06T 2207/20221
    USPC .................... 382/154, 106, 285, 278, 303
    See application file for complete search history.

(56) References Cited

U.S. PATENT DOCUMENTS

| | | | | |
|---|---|---|---|---|
| 2009/0208129 | A1* | 8/2009 | Shimodaira | G06T 5/002 382/264 |
| 2010/0073516 | A1* | 3/2010 | Minakuti | H04N 5/217 348/229.1 |
| 2010/0166337 | A1* | 7/2010 | Murashita | H04N 5/262 382/284 |
| 2011/0019927 | A1* | 1/2011 | Nagamatsu | G06K 9/38 382/225 |
| 2011/0090361 | A1* | 4/2011 | Kobayashi | H04N 5/35554 348/222.1 |
| 2012/0069004 | A1* | 3/2012 | Takama | H04N 13/128 345/419 |
| 2012/0140029 | A1* | 6/2012 | Yamazaki | H04N 13/128 348/43 |
| 2012/0218394 | A1* | 8/2012 | Yoshino | A61B 1/043 348/65 |
| 2012/0220840 | A1* | 8/2012 | Morita | A61B 1/00009 600/317 |
| 2013/0039586 | A1* | 2/2013 | Fuchigami | G06T 7/564 382/199 |
| 2013/0076749 | A1* | 3/2013 | Maeda | G06T 15/08 345/424 |
| 2013/0169363 | A1* | 7/2013 | Chen | H03F 3/45282 330/261 |
| 2013/0235257 | A1* | 9/2013 | Kaida | H04N 5/2351 348/362 |
| 2013/0242152 | A1* | 9/2013 | Kasai | H04N 5/2353 348/294 |
| 2014/0036032 | A1* | 2/2014 | Takahashi | H04N 19/597 348/43 |
| 2014/0205007 | A1* | 7/2014 | Takahashi | H04N 19/50 375/240.03 |
| 2015/0009286 | A1* | 1/2015 | Omori | H04N 13/139 348/42 |
| 2015/0355103 | A1* | 12/2015 | Ando | G06T 7/586 348/46 |

FOREIGN PATENT DOCUMENTS

| | | |
|---|---|---|
| JP | 2012-244396 A | 12/2012 |
| JP | 2013-059016 A | 3/2013 |
| JP | 2013-178684 A | 9/2013 |

\* cited by examiner

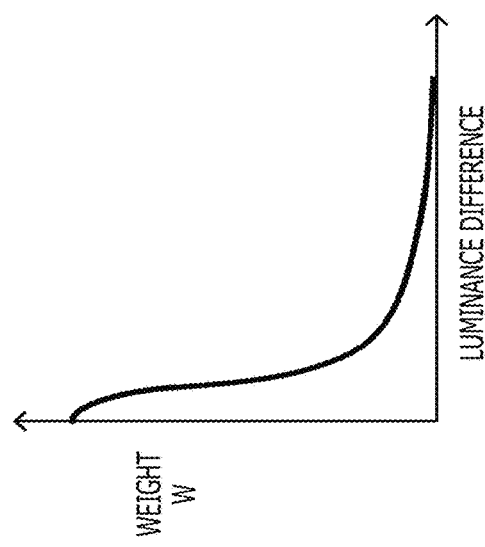
FIG. 3C
FIG. 3B
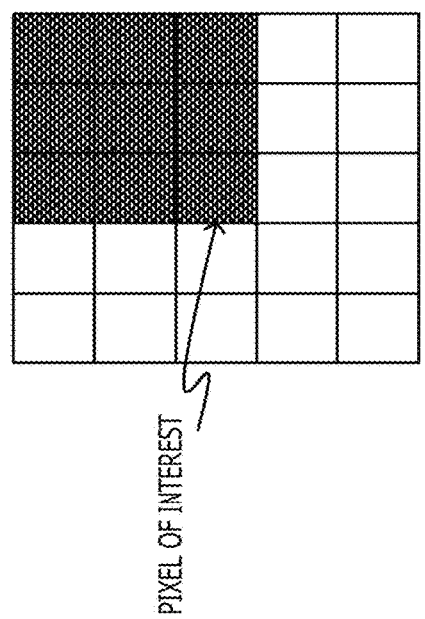
FIG. 3A

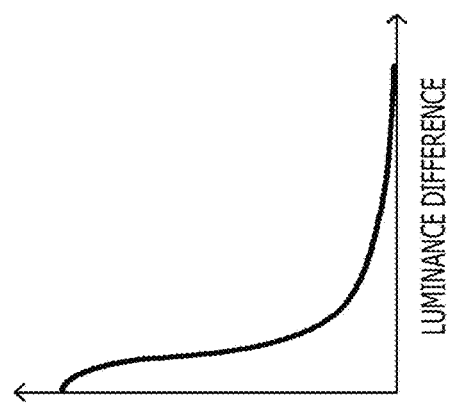
FIG. 4C
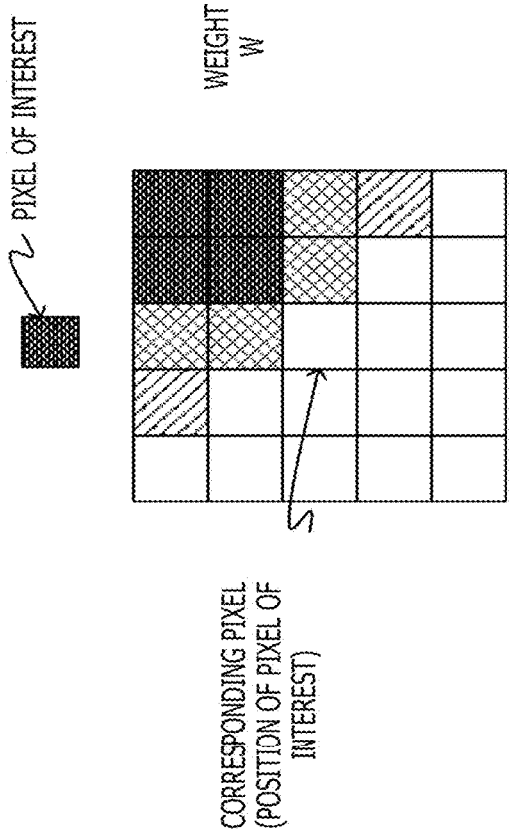
FIG. 4B
FIG. 4A

| DEPTH VALUE | WEIGHT |
|---|---|
| x | 0.1 |
| 64 | 0.2 |
| 96 | 0.9 |
| 98 | 1.0 |
| 32 | 0.8 |
| x | 0.0 |
| x | 0.0 |
| 98 | 0.9 |
| 95 | 1.0 |
| 95 | 1.0 |
| x | 0.0 |
| 5 | 0.1 |
| x | 0.7 |
| 96 | 1.0 |
| 18 | 0.3 |
| 7 | 0.1 |
| x | 0.0 |
| 6 | 0.2 |
| x | 0.1 |
| 5 | 0.0 |
| x | 0.1 |
| 5 | 0.0 |
| x | 0.1 |
| 4 | 0.0 |
| x | 0.0 |

FIG. 9C

| 0.1 | 0.2 | 0.1 | 0.1 | 0 |
|---|---|---|---|---|
| 0.9 | 0.9 | 0.7 | 0.1 | 0 |
| 1.0 | 1.0 | 1.0 | 0.2 | 0.1 |
| 0.8 | 1.0 | 0.3 | 0.1 | 0 |
| 0.1 | 0 | 0.1 | 0.1 | 0 |

FIG. 9B

| 32 | 95 | 18 | 5 | x |
|---|---|---|---|---|
| 98 | 95 | 96 | x | 4 |
| 96 | 98 | x | 6 | x |
| 64 | x | 5 | x | 5 |
| x | x | x | 7 | x |

| DEPTH VALUE | WEIGHT | WEIGHT MERGE RATIO PORTION (× 0.8) |
|---|---|---|
| 5 | 0.1 | 0.08 |
| 5 | 0.1 | 0.08 |
| 96 | 0.7 | 0.56 |
| 96 | 0.7 | 0.56 |
| 98 | 0.8 | 0.64 |
| 4 | 0.1 | 0.08 |
| 5 | 0.1 | 0.08 |
| 95 | 0.9 | 0.72 |
| 96 | 0.9 | 0.72 |
| 96 | 0.8 | 0.64 |
| 5 | 0.1 | 0.08 |
| 5 | 0.1 | 0.08 |
| 95 | 1.0 | 0.80 |
| 96 | 0.7 | 0.56 |
| 95 | 1.0 | 0.80 |
| 5 | 0.1 | 0.08 |
| 4 | 0.1 | 0.08 |
| 5 | 0.2 | 0.16 |
| 6 | 0.1 | 0.08 |
| 5 | 0.1 | 0.08 |
| 5 | 0.1 | 0.08 |
| 4 | 0.1 | 0.08 |
| 5 | 0.1 | 0.08 |
| 5 | 0.1 | 0.08 |
| 4 | 0.1 | 0.08 |

FIG. 10B

| DEPTH VALUE | WEIGHT | WEIGHT MERGE RATIO PORTION (× 0.2) |
|---|---|---|
| x | 0.1 | 0.02 |
| 64 | 0.2 | 0.04 |
| 96 | 0.9 | 0.18 |
| 98 | 1.0 | 0.20 |
| 32 | 0.8 | 0.16 |
| x | 0.0 | 0.00 |
| x | 0.0 | 0.00 |
| 98 | 0.9 | 0.18 |
| 95 | 1.0 | 0.20 |
| 95 | 1.0 | 0.20 |
| x | 0.0 | 0.00 |
| 5 | 0.1 | 0.02 |
| x | 0.7 | 0.14 |
| 96 | 1.0 | 0.20 |
| 18 | 0.3 | 0.06 |
| 7 | 0.1 | 0.02 |
| x | 0.0 | 0.00 |
| 6 | 0.1 | 0.02 |
| x | 0.2 | 0.04 |
| 5 | 0.1 | 0.02 |
| x | 0.0 | 0.00 |
| 5 | 0.1 | 0.02 |
| x | 0.1 | 0.02 |
| 5 | 0.1 | 0.02 |
| x | 0.0 | 0.00 |
| 5 | 0.1 | 0.02 |
| x | 0.0 | 0.00 |
| 4 | 0.1 | 0.02 |
| x | 0.0 | 0.00 |

FIG. 10C

| DEPTH VALUE | WEIGHT (MERGE RATIO PORTION) | ACCUMULATED VALUE | RELIABILITY DETERMINATION REGION |
|---|---|---|---|
| 4 | 0.08 | 0.08 | |
| 4 | 0.08 | 0.16 | |
| 4 | 0.08 | 0.24 | |
| 4 | 0.08 | 0.32 | |
| 4 | 0.02 | 0.34 | |
| ... | ... | ... | |
| 7 | 0.02 | 1.48 | |
| 18 | 0.06 | 1.54 | |
| 32 | 0.16 | 1.70 | |
| 64 | 0.04 | 1.74 | |
| 95 | 0.72 | 2.46 | 0.72 |
| 95 | 0.80 | 3.26 | 1.52 |
| 95 | 0.80 | 4.06 | 2.32 |
| 95 | 0.20 | 4.26 | 2.52 |
| 96 | 0.20 | 4.46 | 2.72 |
| 96 | 0.56 | 5.02 | 3.28 |
| 96 | 0.56 | 5.58 | 3.84 |
| 96 | 0.72 | 6.30 | 4.56 |
| 96 | 0.64 | 6.94 | 5.20 |
| 96 | 0.56 | 7.50 | 5.76 |
| 96 | 0.18 | 7.68 | 5.94 |
| 96 | 0.20 | 7.88 | 6.14 |
| 98 | 0.64 | 8.52 | |
| 98 | 0.20 | 8.72 | |
| 98 | 0.18 | 8.90 | |

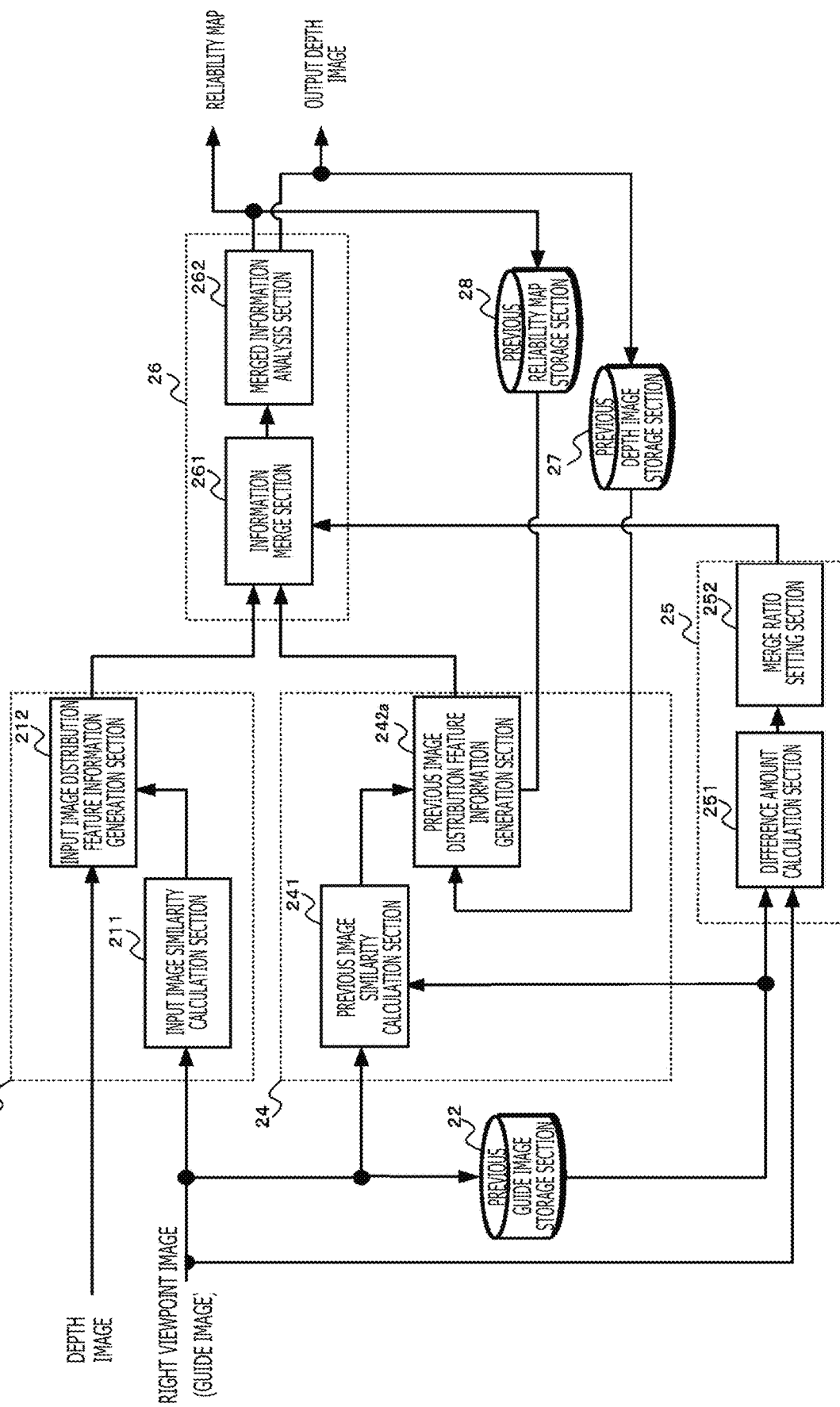

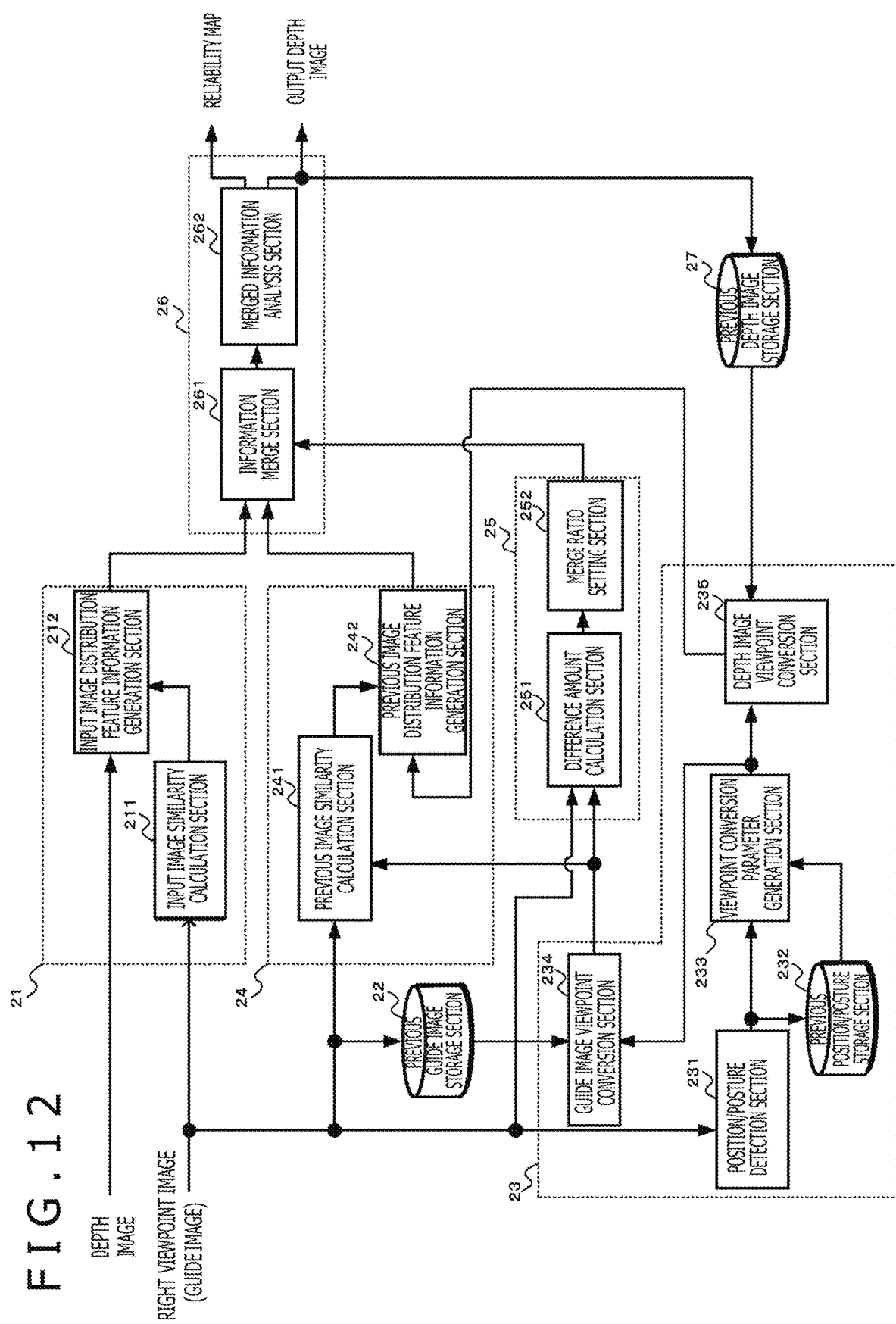

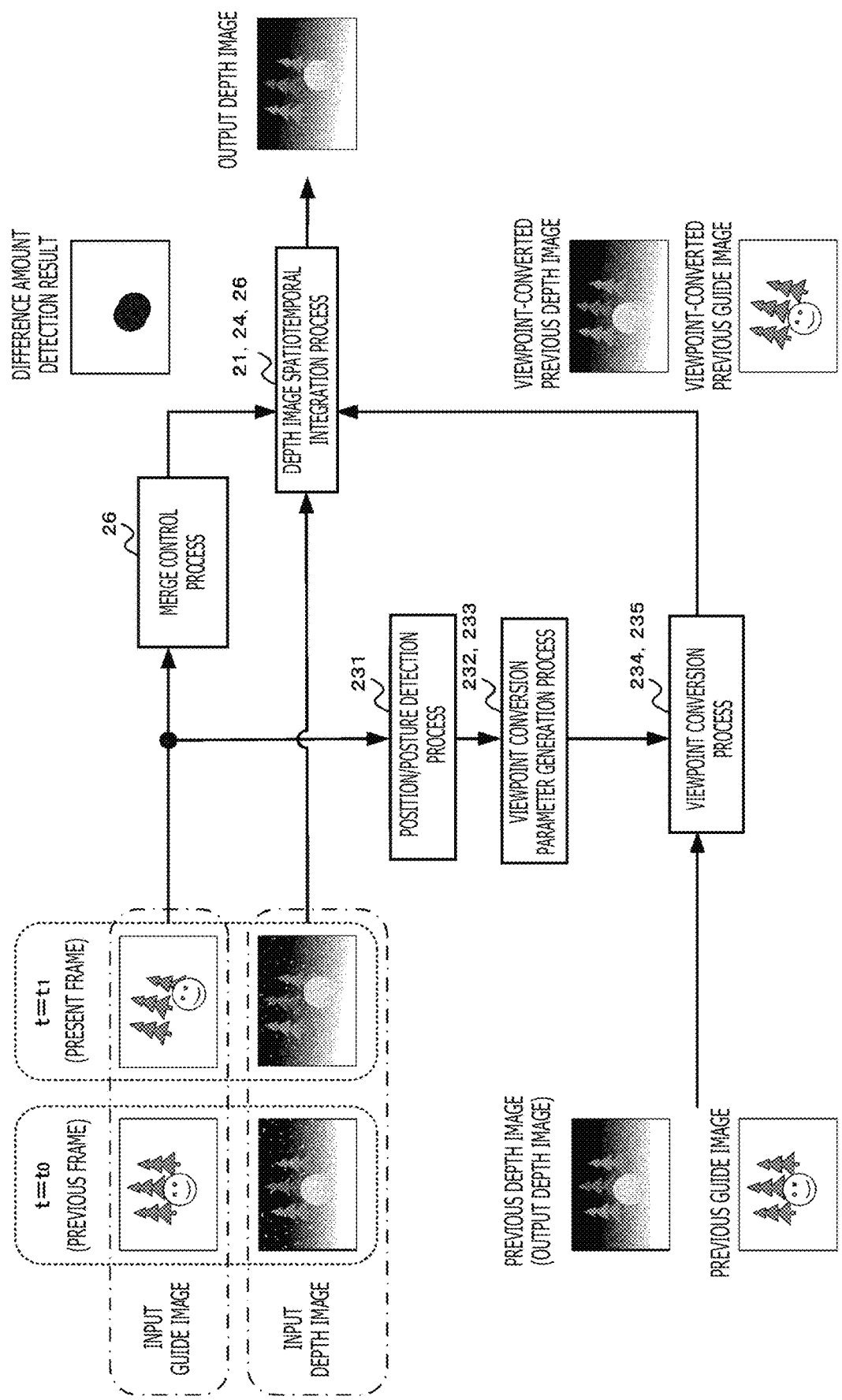

IMAGE PROCESSING DEVICE AND IMAGE PROCESSING METHOD

CROSS REFERENCE TO RELATED APPLICATIONS

This application is a U.S. National Phase of International Patent Application No. PCT/JP2017/001198 filed on Jan. 16, 2017, which claims priority benefit of Japanese Patent Application No. JP 2016-076571 filed in the Japan Patent Office on Apr. 6, 2016. Each of the above-referenced applications is hereby incorporated herein by reference in its entirety.

TECHNICAL FIELD

The present technology relates to an image processing device and an image processing method, and improves the spatiotemporal stability of a depth image.

BACKGROUND ART

In recent years, a depth image adapted to express the distance to an object by using an image is generated and used, for example, for a gesture user interface. Further, the depth image is generated, for example, by performing matching with a left-eye image and a right-eye image as disclosed, for example, in PTL 1.

Furthermore, a proposal has been made in the field of image processing to provide improved spatiotemporal stability. For example, an invention disclosed in PTL 2 provides motion compensation in accordance with spatial information concerning a reference image having spatial correlation with an input image, and generates an interpolated output image. Moreover, the invention disclosed in PTL 2 generates a non-noisy image by mixing the input image with the interpolated output image in accordance with a feedback adjustment amount calculated on the basis of temporal direction changes in the reference image.

CITATION LIST

Patent Literature

[PTL 1]
  JP 2012-244396A
[PTL 2]
  JP 2013-059016A

SUMMARY

Technical Problem

Incidentally, when processing is performed as described in PTL 2, a depth value is averaged, for example, in a boundary region between a foreground and a background. Thus, the resulting depth value in the boundary region is different from those in the foreground and the background. Consequently, the spatiotemporal stability cannot be improved.

In view of the above circumstances, an object of the present technology is to provide an image processing device and an image processing method that are capable of improving the spatiotemporal stability of a depth image.

Solution to Problem

According to a first aspect of the present technology, there is provided an image processing device including a depth value processing section. The depth value processing section merges input image depth distribution feature information with previous image depth distribution feature information in order to generate merged depth distribution feature information, calculates a representative depth value from the merged depth distribution feature information, and regards the calculated representative depth value as a depth value of a pixel of interest of an input image. The input image depth distribution feature information is based on the pixel value and depth value of pixels in a peripheral region with respect to the pixel of interest of an input image. The previous image depth distribution feature information is based on the pixel value of the pixel of interest and the pixel value and depth value of pixels in a peripheral region with respect to a pixel corresponding to the pixel position of the pixel of interest in a previous image. The previous image is an image earlier than the input image.

In accordance with the pixel value and depth value of the pixels in the peripheral region with respect to the pixel of interest in the input image, an input image information generation processing section according to the present technology associates a depth value with a weight corresponding to the pixel information similarity between the pixel of interest and, for example, each pixel in the peripheral region, and generates a depth histogram or a depth table as the input image depth distribution feature information. The depth histogram is obtained by accumulating the weight of each depth value. The depth table indicates the weight of each depth value.

In accordance with the pixel value of the pixel of interest and the pixel value and depth value of pixels in the peripheral region with respect to a corresponding pixel while the corresponding pixel corresponds to the pixel position of the pixel of interest in the previous image, which is an image earlier than the input image, a previous image information generation processing section associates a depth value with a weight corresponding to the pixel information similarity between the pixel of interest and, for example, each pixel in the peripheral region of the previous image, and generates a depth histogram or a depth table as the previous image depth distribution feature information. The depth histogram is obtained by accumulating the weight of each depth value. The depth table indicates the weight of each depth value.

Further, the input image information generation processing section and the previous image information generation processing section increase the weight in accordance with pixel information, for example, in accordance with an increase in luminance or color similarity.

A merge control section sets a merge ratio in accordance with the amount of pixel information difference between the pixel of interest and the corresponding pixel. When the amount of pixel information difference between the pixel of interest and the corresponding pixel increases, the merge control section increases the merge ratio of the input image depth distribution feature information generated by the input image information generation processing section.

The depth value processing section generates the merged depth distribution feature information by merging the input image depth distribution feature information generated by the input image information generation processing section with the previous image depth distribution feature information generated by the previous image information generation processing section at the merge ratio set by the merge control section. The depth value processing section generates a merged depth histogram or a merged depth table by merging depth histograms or depth tables while assuming, for example, the weights of the depth histograms or depth tables as the weights based on the merge ratio. The depth value processing section regards the representative depth value calculated from the merged depth distribution feature information, for example, the merged depth distribution feature information, as depth value order information, and handles a median depth value of the accumulated weight value as the representative depth value. Further, the depth value processing section calculates the ratio of total weight in a predetermined depth range based on the representative depth value to the total weight of the merged depth distribution feature information as the reliability of the representative depth value. If the reliability of the representative depth value is equal to or higher than a preset determination threshold value, the depth value processing section regards the representative depth value as the depth value of the pixel of interest. If, by contrast, the reliability is lower than the preset determination threshold value, the depth value processing section regards the depth value of the pixel of interest as an invalid value. Furthermore, the depth value processing section is capable of changing the determination threshold value.

Moreover, the previous image information generation processing section generates depth distribution feature information by excluding pixels indicative of an invalid value from pixels in the peripheral region with respect to the corresponding pixel. Further, the previous image information generation processing section may generate the previous image depth distribution feature information in accordance with the pixel value, depth value, and reliability of pixels in the peripheral region with respect to the corresponding pixel and with the pixel value of the pixel of interest.

Furthermore, a viewpoint conversion processing section is included to convert at least either one of the input image and the previous image to an image that coincides in viewpoint with the other image. The input image information generation processing section and the previous image information generation processing section generate the input image depth distribution feature information and the previous image depth distribution feature information by using the images having the same viewpoint as a result of the conversion by the viewpoint conversion processing section.

According to a second aspect of the present technology, there is provided an image processing method including: merging input image depth distribution feature information with previous image depth distribution feature information in order to generate merged depth distribution feature information; calculating a representative depth value from the merged depth distribution feature information; and regarding the calculated representative depth value as a depth value of a pixel of interest of an input image. The input image depth distribution feature information is based on the pixel value and depth value of pixels in a peripheral region with respect to the pixel of interest of an input image. The previous image depth distribution feature information is based on the pixel value of the pixel of interest and the pixel value and depth value of pixels in a peripheral region with respect to a pixel corresponding to the pixel position of the pixel of interest in a previous image. The previous image is an image earlier than the input image.

Advantageous Effects of Invention

The present technology merges the input image depth distribution feature information with the previous image depth distribution feature information in order to generate the merged depth distribution feature information, calculates the representative depth value from the merged depth distribution feature information, and regards the calculated representative depth value as the depth value of the pixel of interest. The input image depth distribution feature information is based on the pixel value and depth value of pixels in a peripheral region with respect to the pixel of interest of an input image. The previous image depth distribution feature information is based on the pixel value of the pixel of interest and the pixel value and depth value of pixels in a peripheral region with respect to a pixel corresponding to the pixel position of the pixel of interest in a previous image. The previous image is an image earlier than the input image. Consequently, a highly reliable depth value is regarded as the depth value of an image of interest in accordance with pixel information and depth value of a pixel in a spatiotemporal direction with respect to the image of interest. This makes it possible to improve the spatiotemporal stability of a depth image. The advantages described in this document are merely illustrative and not restrictive. The present technology can provide additional advantages.

BRIEF DESCRIPTION OF DRAWINGS

FIGS. 3A, 3B, and 3C depict diagrams illustrating a weight calculation operation that is performed by using an input guide image.
FIGS. 4A, 4B, and 4C depict diagrams illustrating a weight calculation operation that is performed by using a previous guide image.
FIGS. 9A 9B, and 9C are diagrams illustrating operations of a previous image distribution feature information generation section.
FIGS. 10A, 10B, and 10C depict diagrams illustrating operations of a depth value processing section.
FIG. 11 is a diagram illustrating a configuration of a third embodiment.
FIG. 12 is a diagram illustrating a configuration of a fourth embodiment.
FIG. 16 is a diagram illustrating operations of the fourth embodiment.

DESCRIPTION OF EMBODIMENTS

Embodiments of the present technology will now be described. The description will be given in the following order.

Figure 1:
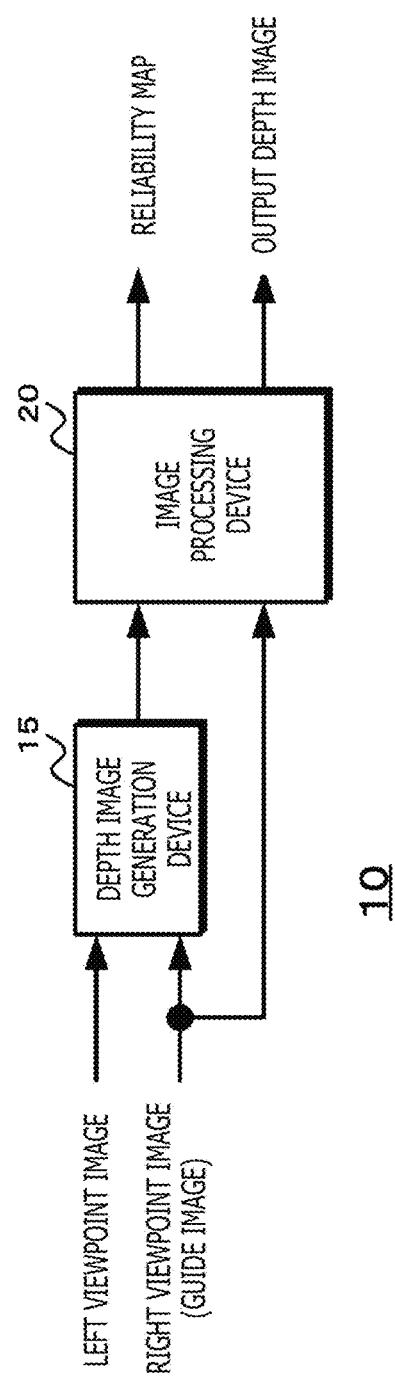
FIG. 1 is a diagram illustrating a configuration of a depth image generation system.

1. Configuration of depth image generation system
2. First Embodiment
3. Second Embodiment
4. Third Embodiment
5. Fourth Embodiment 1. Configuration of Depth Image Generation System FIG. 1 illustrates a configuration of a depth image generation system that uses an image processing device provided by the present technology. The depth image system 10 includes a depth image generation device 15 and an image processing device 20.

The depth image generation device 15 performs a matching process by using a right viewpoint image and a left viewpoint image, selects either the right viewpoint image or the left viewpoint image as a reference, and generates a depth image (referred to also as a depth map) indicative of the distance (depth value) between an object and the reference viewpoint image (referred to also as the "guide image"). It should be noted that FIG. 1 illustrates a case where the right viewpoint image is selected as the guide image. The matching process may be performed by using any matching technique such as a region-based matching technique, a feature-based matching technique, or a template matching technique. The depth image generation device 15 performs the matching process to calculate the distance (depth value) between the object and a pixel of interest in the right viewpoint image in accordance with the amount of deviation between the pixel of interest in the right viewpoint image (guide image) and a corresponding pixel position in the left viewpoint image. Further, the depth image generation device 15 sequentially moves the pixel position of the pixel of interest in the right viewpoint image, performs the matching process, and generates a depth image indicative of a depth value calculated at each pixel position or pixel information (e.g., luminance) based on the depth value. The depth image generation device 15 outputs the generated depth image to the image processing device 20.

The image processing device 20 generates depth distribution feature information in accordance with the pixel value and depth value of pixels in a peripheral region with respect to the pixel of interest in an input image. Further, the image processing device 20 generates the depth distribution feature information in accordance with the pixel value of the pixel of interest and the pixel value and depth value of pixels in a previous image peripheral region with respect to a corresponding pixel while the corresponding pixel corresponds to the pixel position of the pixel of interest in a previous image that an image earlier than the input image. Moreover, the image processing device 20 improves the spatiotemporal stability of the depth image by merging the depth distribution feature information generated from the input image with the depth distribution feature information generated from the previous image at a merge ratio set in accordance with the amount of pixel information difference between the pixel of interest and the corresponding pixel, calculating a representative depth value from the merged depth distribution feature information, and regarding the calculated representative depth value as the depth value of the pixel of interest. Additionally, the image processing device 20 generates a reliability map that indicates the depth value reliability of each pixel in the depth image having improved stability.

2. First Embodiment

Figure 2:
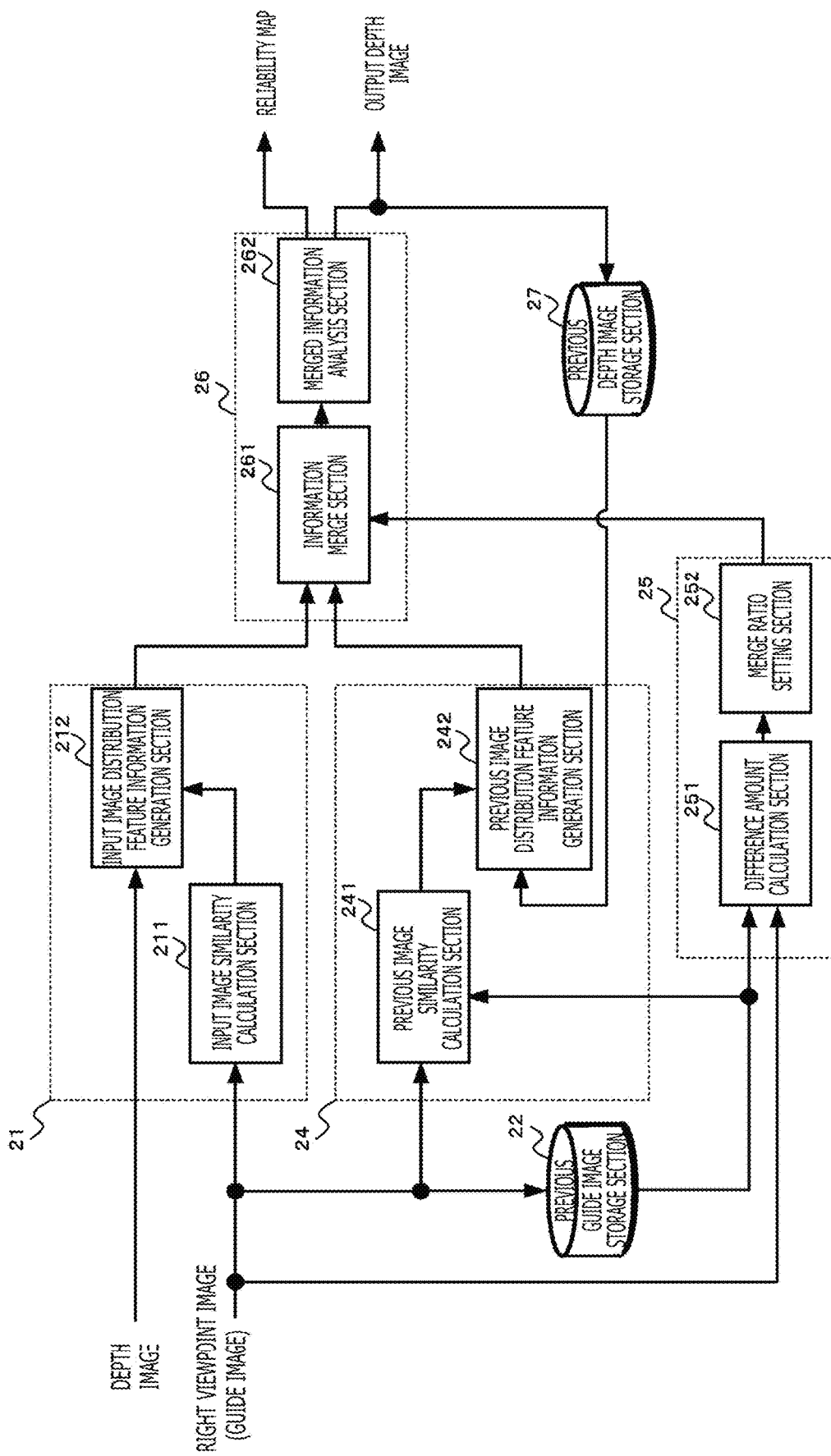
FIG. 2 is a diagram illustrating a configuration of a first embodiment.

The image processing device according to a first embodiment will now be described. FIG. 2 illustrates a configuration of the image processing device according to the first embodiment. The image processing device 20 includes an input image information generation processing section 21, a previous guide image storage section 22, a previous image information generation processing section 24, a merge control section 25, a depth value processing section 26, and a previous depth image storage section 27.

The input image information generation processing section 21 generates the depth distribution feature information (hereinafter referred to as the "input image depth distribution feature information") in accordance with the pixel value and depth value of pixels in a peripheral region (hereinafter referred to as the "pixel in the input image peripheral region") with respect to a pixel of interest in the input image. The input image information generation processing section 21 includes an input image similarity calculation section 211 and an input image distribution feature information generation section 212. The peripheral region is a predetermined region including a region of interest that is based on the pixel of interest. The pixels in the peripheral region include the pixel of interest. Further, the peripheral region of the input image (input guide image and input depth image) is referred to as the input image peripheral region.

For each pixel of interest, the input image similarity calculation section 211 calculates a weight based on pixel information similarity between the pixel of interest in the input guide image and pixels in the input image peripheral region, and causes the weight to increase with an increase in the pixel information similarity. For example, the input image similarity calculation section 211 uses the luminance of the pixel of interest and the luminance of the pixels in the input image peripheral region as pixel information to calculate the weight Wpresent (n,x,x') in accordance with Equation (1). In Equation (1), n is the frame number of the input guide image, and I(n) is the luminance of the input guide image. Further, x is a two-dimensional vector indicative of the position of the pixel of interest, and x' is a two-dimensional vector indicative of the position of a pixel in the input image peripheral region (the reference pixel of the two-dimensional vector is, for example, the upper leftmost pixel). Furthermore, Equation (1) sets a Gaussian-distribution-based weight with respect to luminance difference by using a Gaussian coefficient "σ." It should be noted that the value of the Gaussian coefficient σ is preset.

[Math. 1]

$$w_{present}(n, x, x') = e^{-\frac{(I(n,x) - I(n,x'))^2}{2\sigma^2}} \quad (1)$$

FIGS. 3A, 3B, and 3C depict diagrams illustrating a weight calculation operation that is performed by using the input guide image. FIG. 3A illustrates the luminance of pixels of interest in the input guide image and pixels in the input image peripheral region. FIG. 3B illustrates the relationship between luminance difference and weight, which is indicated in Equation (1). The weight increases with a decrease in the luminance difference, that is, with an increase in similarity. In accordance with Equation (1), the input image similarity calculation section 211 calculates the weight based on the luminance difference between the pixels of interest in the input guide image and the pixels in the input image peripheral region. FIG. 3C illustrates the weight Wpresent that is calculated for each pixel in the input image peripheral region.

It should be noted that the input image similarity calculation section 211 need not always calculate the weight by using only the luminance as pixel information. Alternatively, the input image similarity calculation section 211 may calculate the weight by using color, texture shape, or other information or by using two or more items of information.

For each pixel of interest, the input image distribution feature information generation section 212 associates the depth value of a pixel in the input image peripheral region with the weight determined by the input image similarity calculation section 211 in order to generate the input image depth distribution feature information. The input image depth distribution feature information indicates the relationship between the weight and the depth value in the input image peripheral region. For example, the first embodiment generates a present depth histogram indicative of an accumulated weight value of each depth value as the input image depth distribution feature information. In accordance with Equation (2), the input image distribution feature information generation section 212 generates the present depth histogram Hpresent(n,x,d). In Equation (2), D(n,x) is the depth value of a pixel of interest in the input guide image, and d (e.g., 0≤d≤255) is an integer value indicative of the depth value. Further, the input image peripheral region based on the pixel of interest x is specified by a local window function W(x), and the present depth histogram is generated by using the weight and the depth value of a pixel in a region indicated by the local window function W(x). It should be noted that the integer value d indicative of the depth value is equivalent to classes (bins) of the present depth histogram. Weights of peripheral pixels for which the integer value d is equal to the depth value are added together in accordance with Equation (3). The resulting value is regarded as a frequency with respect to the integer value d.

[Math. 2]

$$H_{present}(n, x, d) = \sum_{x' \in W(x)} w_{present}(N, x, x')\delta(D(n, x') - d) \quad (2)$$

$$\delta(m) = \begin{cases} 1 & \text{if } m = 0 \\ 0 & \text{if } m \text{ is other than } 0 \end{cases} \quad (3)$$

The previous guide image storage section 22 stores a previous guide image (e.g., a guide image one frame earlier). The previous guide image is an image earlier than the input guide image. Further, the previous guide image storage section 22 outputs the stored previous guide image to the previous image information generation processing section 24 and the merge control section 25.

The previous image information generation processing section 24 uses the input guide image, the previous guide image, and a previous depth image indicative of the distance to an object in the previous guide image. The previous image information generation processing section 24 regards the pixel position of a pixel of interest in the previous guide image, which is an image earlier than the input guide image, as a corresponding pixel. In accordance with the pixel value and depth value of a pixel in the previous image peripheral region with respect to the corresponding pixel and with the pixel value of a pixel of interest, the previous image information generation processing section 24 generates the depth distribution feature information (hereinafter referred to as the "previous depth distribution feature information"). The previous image information generation processing section 24 includes a previous image similarity calculation section 241 and a previous image distribution feature information generation section 242.

For each pixel of interest, the previous image similarity calculation section 241 calculates a weight based on pixel information similarity between the pixel of interest in the input guide image and pixels in the previous image peripheral region in the previous guide image, and causes the weight to increase with an increase in the pixel information similarity. For example, the previous image similarity calculation section 241 uses the luminance of the pixel of interest and the luminance of the pixels in the previous image peripheral region as the pixel information to calculate the weight Wprevious(n,x,x') in accordance with Equation (4). In Equation (4), n is the frame number of the input guide image, 1(n) is the luminance of the input guide image, n−1 is the frame number of the previous guide image (e.g., a guide image one frame earlier), and 1(n−1) is the luminance of the previous guide image. Further, x is a two-dimensional vector indicative of the position of a pixel of interest, and x' is a two-dimensional vector indicative of the position of a pixel in the previous image peripheral region (the reference pixel of the two-dimensional vector is, for example, the upper leftmost pixel). Furthermore, as is the case with Equation (1), Equation (4) sets a Gaussian-distribution-based weight with respect to luminance difference by using the Gaussian coefficient "σ." It should be noted that the value of the Gaussian coefficient σ need not always be equal to the corresponding value in Equation (1). The Gaussian coefficient σ may alternatively be set to a value different from the corresponding value in Equation (1). Moreover, the previous image peripheral region need not always be at the same position and of the same region size as the input image peripheral region with respect to the pixel of interest. For example, the previous image peripheral region may alternatively be of a different region size.

[Math. 3]

$$w_{previous}(n, x, x') = e^{-\frac{(I(n,x) - I(n-1,x'))^2}{2\sigma^2}} \quad (4)$$

FIGS. 4A, 4B, and 4C depict diagrams illustrating a weight calculation operation that is performed by using the previous guide image. FIG. 4A depicts a guide image (e.g., a luminance image) of the previous image peripheral region. FIG. 4B depicts the relationship between luminance difference and weight, which is indicated in Equation (4). The weight increases with a decrease in the luminance difference. For each pixel in the previous image peripheral region, the previous image similarity calculation section 241 determines a weight based on the luminance difference between the pixels of interest in the input guide image and the pixels in the previous image peripheral region in accordance with Equation (4). FIG. 4C illustrates the weight Wpresent that is calculated for each pixel in the previous image peripheral region.

It should be noted that the previous image similarity calculation section 241 need not always calculate the weight by using only the luminance, as is the case with the input image similarity calculation section 211. Alternatively, the previous image similarity calculation section 241 may calculate the weight by using color, texture shape, or other information or by using two or more items of information.

The previous image distribution feature information generation section 242 associates the depth value of a pixel in the previous image peripheral region of a previous depth image stored in the previous depth image storage section 27 with the weight determined by the previous image similarity calculation section 241 in order to generate the previous image depth distribution feature information. The previous image depth distribution feature information indicates the relationship between the weight and the depth value in the previous image peripheral region. For example, the first embodiment generates a previous depth histogram indicative of the depth value of a pixel in the previous image peripheral region of a previous depth image and an accumulated weight value of each depth value as the previous image depth distribution feature information. In accordance with Equation (5), the previous image distribution feature information generation section 242 generates the previous depth histogram Hprevious(n,x,d). In Equation (5), Dfiltered (n−1,x) is the depth value of a pixel at a position "x'" in the previous image peripheral region, and d (e.g., 0≤d≤255) is an integer value indicative of the depth value. Further, the previous image peripheral region based on the pixel of interest x is specified by the local window function W(x), and the previous depth histogram is generated by using the weight and the depth value of a pixel in a region indicated by the local window function W(x). It should be noted that the integer value d indicative of the depth value is equivalent to classes (bins) of the previous depth histogram. Weights of peripheral pixels for which the integer value d is equal to the depth value are added together in accordance with Equation (6). The resulting value is regarded as a frequency with respect to the integer value d.

[Math. 4]

$$H_{previous}(n, x, d) = \sum_{x' \in W(x)} w_{previous}(n, x, x')\delta(D_{filtered}(n-1, x') - d) \quad (5)$$

$$\delta(m) = \begin{cases} 1 & \text{if } m = 0 \\ 0 & \text{if } m \text{ is other than } 0 \end{cases} \quad (6)$$

In accordance with the pixel information difference between a pixel of interest in the input guide image and a corresponding pixel corresponding to a pixel of interest in the previous guide image, the merge control section 25 sets, for each pixel of interest, a merge ratio between the input image depth distribution feature information and the previous image depth distribution feature information. The merge control section 25 includes a difference amount calculation section 251 and a merge ratio setting section 252.

The difference amount calculation section 251 calculates the amount of pixel information difference between a pixel of interest in the input guide image and a corresponding previous image corresponding to the position of the pixel of interest by using the input guide image and the previous guide image stored in the previous guide image storage section 22. For example, the difference amount calculation section 251 generates a difference amount Idiff(n,x) from the luminance 1(n,x) of the pixel of interest and the luminance (n−1,x) of the corresponding pixel in accordance with Equation (7). If, for example, the corresponding pixel is a pixel in an object region and the pixel of interest becomes a pixel in a background region due to the movement of the object, the difference amount Idiff(n,x) is a greater value than in a case where the object does not move. It should be noted that the difference amount calculation section 251 need not always calculate the difference amount by using only the luminance as pixel information. Alternatively, the difference amount calculation section 251 may calculate the difference amount by using color or other information or by using two or more items of information.

[Math. 5]

$$I_{diff}(n,x)=|I(n,x)-I(n-1,x)| \quad (7)$$

Figure 5:
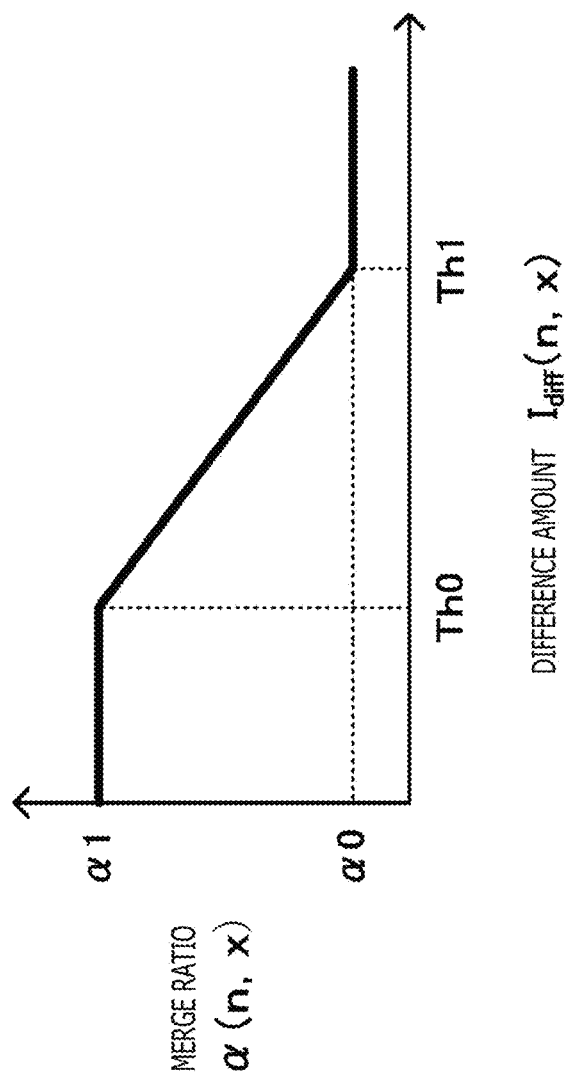
FIG. 5 is a diagram illustrating the relationship between a difference amount and a merge ratio.

In accordance with the difference amount Idiff(n,x) calculated by the difference amount calculation section 251, the merge ratio setting section 252 sets the merge ratio so that the ratio of the input image depth distribution feature information generated by the input image information generation processing section 21 increases with an increase in the amount of difference between the pixel of interest and the corresponding pixel. For example, the merge ratio setting section 252 sets the merge ratio α(n,x) in accordance with Equation (8). In Equation (8), threshold values Th0, Th1 are preset in consideration, for example, of input image noise at a plurality of viewpoints so that a depth image stable in a spatiotemporal direction is obtained. Further, the relationship between the difference amount Idiff(n,x) expressed in Equation (7) and the merge ratio α(n,x) is as depicted in FIG. 5. The merge ratio setting section 252 outputs the merge ratio α(n,x), which is set for each pixel of interest, to the depth value processing section 26. It should be noted that the merge ratio is preset to α0 or α1, and that 0≤α0≤α1.

[Math. 6]

$$\alpha(n, x) = \begin{cases} \alpha_1 & \text{if } I_{diff}(n, x) < Th0 \\ \alpha_1 + (\alpha_0 - \alpha_1)\dfrac{I_{diff}(n, x) - Th0}{Th1 - Th0} & \text{if } Th0 \leq I_{diff}(n, x) < Th1 \\ \alpha_0 & \text{otherwise} \end{cases} \quad (8)$$

As described above, the merge ratio setting section 252 sets the merge ratio so that the ratio of the input image depth distribution feature information increases with an increase in the amount of pixel information difference between the pixel of interest and the corresponding pixel. Therefore, if, for example, the object moves to increase the difference amount, the ratio of the depth distribution feature information before the movement can be decreased to avoid the influence of the object movement.

For each pixel of interest, the depth value processing section 26 merges, at the merge ratio set by the merge control section 25, the input image depth distribution feature information generated by the input image information generation processing section 21 with the previous image depth distribution feature information generated by the previous image information generation processing section 24. Further, the depth value processing section 26 regards a representative depth value calculated from the depth distribution feature information derived from the merge (hereinafter referred to as the "merged depth distribution feature information") as the depth value of a pixel of interest, and generates an output depth image. The depth value processing section 26 includes an information merge section 261 and a merged information analysis section 262.

The information merge section 261 merges, for example, the present depth histogram generated by the input image information generation processing section 21 with the previous depth histogram generated by the previous image information generation processing section 24 at the merge ratio α(n,x) set by the merge control section 25. Equation (9) represents merge processing. The information merge section 261 performs calculations indicated in Equation (9), and generates a merged depth histogram, which is merged depth distribution feature information, by merging the weights of the present depth histogram and previous depth histogram at the merge ratio as the weight of each depth value.

[Math. 7]

$$H_{merged}(n,x,d) = \alpha(n,x) H_{previous}(n,x,d) + (1-\alpha(n,x)) H_{present}(n,x,d) \quad (9)$$

Figure 6:
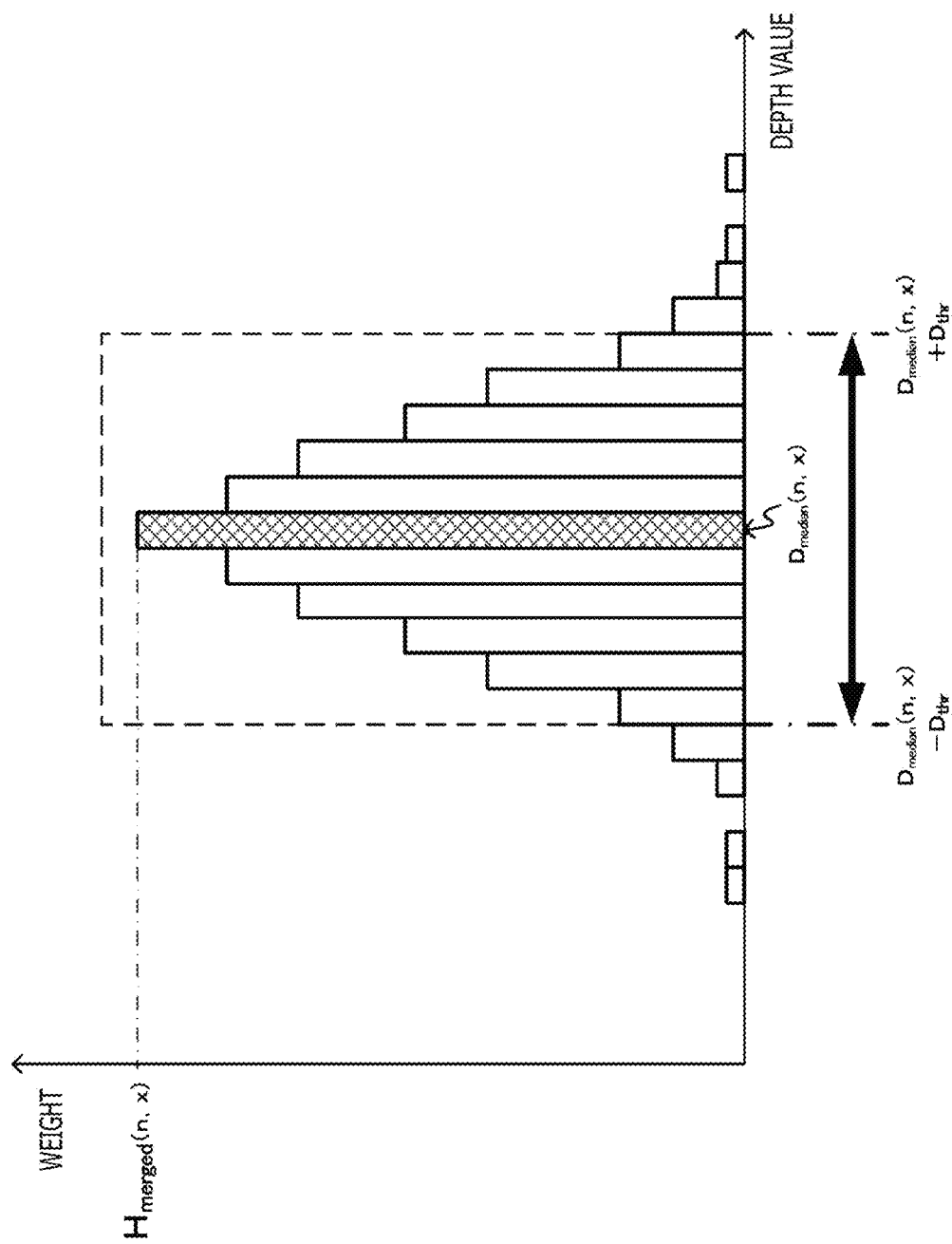
FIG. 6 is a diagram illustrating a merged depth histogram.

FIG. 6 illustrates the merged depth histogram. Depth values are regarded as classes (bins), and the weights of the present depth histogram and previous depth histogram are added together for each class in accordance with the merge ratio. The resulting value is handled as a frequency.

The merged information analysis section 262 performs statistical analysis in accordance with the merged depth histogram, and calculates the representative depth value. Further, the merged information analysis section 262 calculates the reliability of the representative depth value. If the calculated reliability is not lower than a preset determination threshold value, the merged information analysis section 262 regards the representative depth value as the depth value of a pixel of interest. If, by contrast, the calculated reliability is lower than the determination threshold value, the merged information analysis section 262 regards the depth value of the pixel of interest as an invalid value. The merged information analysis section 262 calculates, for example, a median depth value of the merged depth histogram as the representative depth value. Furthermore, the merged information analysis section 262 calculates, as the reliability, the ratio of the total weight of a reliability determination region (predetermined class width) based on the representative depth value to the total weight of the whole class width of the merged depth histogram.

For example, the merged information analysis section 262 calculates the median depth value Dmedian(n,x) of the merged depth histogram Hmerged(n,x) as the representative depth value. It should be noted that the merged information analysis section 262 excludes an invalid value Dinvalid in the calculation of the median depth value Dmedian(n,x). As depicted in FIG. 6, the merged information analysis section 262 uses Equation (10) to calculate the total weight Wsum_around_med(n,x) of the reliability determination region (Dmedian(n,x)−Dthr)≤d≤(Dmedian(n,x)+Dthr) based on the calculated median depth value Dmedian(n,x). Further, the merged information analysis section 262 calculates the total weight Wtotal(n,x) of the whole class width in accordance with Equation (11).

[Math. 8]

$$W_{sum\_around\_med}(n, x) = \sum_{i=D_{median}(x)-D_{thr}}^{D_{median}(x)+D_{thr}} H_{merged}(n, x, i) \quad (10)$$

$$W_{total}(n, x) = \sum_{i} H_{merged}(n, x, i) \quad (11)$$

As indicated in Equation (12), the merged information analysis section 262 calculates the ratio of the total weight Wsum_around_med(n,x) of the reliability determination region to the total weight Wtotal(n,x) of the whole class width as the reliability Dconfidence(n,x).

[Math. 9]

$$D_{Confidence}(n, x) = \frac{W_{sum\_around\_med}(n, x)}{W_{total}(n, x)} \quad (12)$$

Furthermore, the merged information analysis section 262 performs a process indicated in Equation (13) by using a preset determination threshold value Thhist_ratio, determines the median depth value Dmedian(n,x) that exhibits the reliability Dconfidence(n,x) not lower than the determination threshold value Thhist_ratio, and regards the determined median depth value Dmedian(n,x) as the depth value Dfiltered(n,x) of a pixel of interest. Moreover, if the reliability Dconfidence(n,x) is lower than the determination threshold value Thhist_ratio, the merged information analysis section 262 regards the depth value Dfiltered(n,x) of the pixel of interest as an invalid value Dinvalid. It should be noted that the invalid value Dinvalid is distinguishable from the depth value indicated by a depth image.

[Math. 10]

$$D_{filtered}(n, x) = \begin{cases} D_{median}(n, x) & \text{if } D_{confidence}(x) \geq Th_{histo\_ratio} \\ D_{invalid} & \text{otherwise} \end{cases} \quad (13)$$

Further, the merged information analysis section 262 is able to change the determination threshold value Thhist_ratio. If, for example, a highly-reliable output depth image is to be generated, the merged information analysis section 262 increases the determination threshold value Thhist_ratio and regards only a highly-reliable representative depth value as the depth value of the pixel of interest. Meanwhile, in a case where pixels of an output depth image from which the depth value is not acquired are to be decreased in number, the merged information analysis section 262 decreases the determination threshold value Thhist_ratio so that the calculated representative depth value is likely to be regarded as the depth value of the pixel of interest.

The merged information analysis section 262 generates an output depth value by calculating the depth value Dfiltered(n,x) of each pixel of interest. The merged information analysis section 262 associates the reliability Dconfidence(n,x) calculated for each pixel of interest with the output depth image, and outputs the resulting output depth image. Further, the merged information analysis section 262 causes the previous depth image storage section 27 to store the generated output depth image as the previous depth image. It should be noted that the previous depth image stored in the previous depth image storage section 27 is a depth image indicative of the distance to an object in a previous guide image stored in the previous guide image storage section 22.

Figure 7:
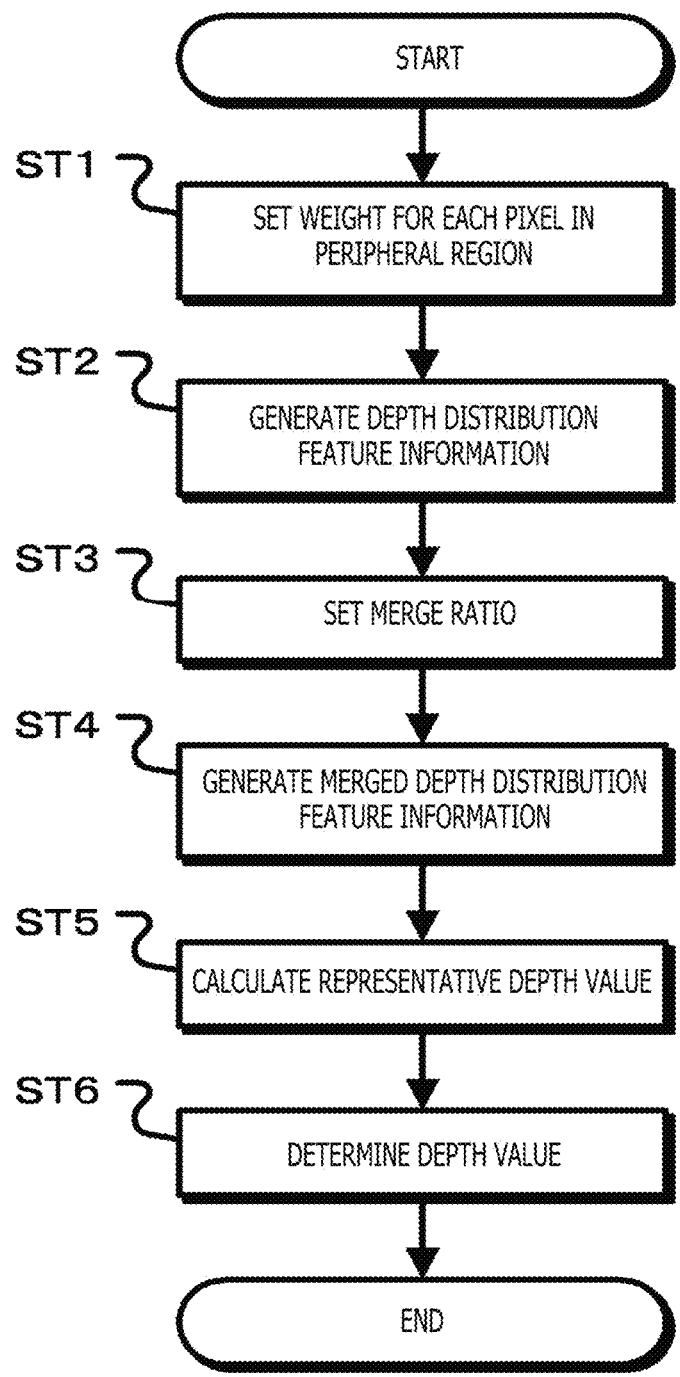
FIG. 7 is a flowchart illustrating operations of the first embodiment.

Operations of the first embodiment will now be described. FIG. 7 is a flowchart illustrating the operations of the first embodiment. In step ST1, the image processing device sets a weight for each pixel in the peripheral region. The input image similarity calculation section 211 of the input image information generation processing section 21 in the image processing device 20 calculates the pixel information similarity between a pixel of interest in the input guide image and a pixel in the input image peripheral region, and sets a weight based on the calculated similarity for each pixel in the input image peripheral region. Similarly, the previous image similarity calculation section 241 of the previous image information generation processing section 24 calculates the pixel information similarity between the pixel of interest and a pixel in the previous image peripheral region of the previous guide image, and sets a weight based on the calculated similarity for each pixel in the previous image peripheral region. The image processing device 20 sets the weight for each pixel in the input image peripheral region and in the previous image peripheral region, and proceeds to step ST2.

In step ST2, the image processing device generates the depth distribution feature information. The input image distribution feature information generation section 212 of the input image information generation processing section 21 in the image processing device 20 generates the input image depth distribution feature information by associating the depth value of a pixel in the input image peripheral region with the weight of the pixel in the input image peripheral region, which is determined by the input image similarity calculation section 211. For example, the input image distribution feature information generation section 212 generates, as the input image depth distribution feature information, a present depth histogram whose frequency is the accumulated weight value of each depth value while each depth value is regarded as a class. The previous image distribution feature information generation section 242 of the previous image information generation processing section 24 generates the previous image depth distribution feature information by associating the depth value of a pixel in the previous image peripheral region of the previous depth image with the weight of a pixel in the previous image peripheral region, which is calculated by the previous image similarity calculation section 241. For example, the previous image distribution feature information generation section 242 generates, as the previous image depth distribution feature information, a previous depth histogram whose frequency is the accumulated weight value of each depth value while each depth value is regarded as a class. The image processing device 20 generates the input image depth distribution feature information and the previous image depth distribution feature information, and proceeds to step ST3.

In step ST3, the image processing device sets the merge ratio. In accordance with the amount of pixel information difference between a pixel of interest in the input guide image and a corresponding pixel in the previous guide image, the merge control section 25 in the image processing device 20 sets the merge ratio between the input image depth distribution feature information and the previous image depth distribution feature information. The merge control section 25 sets the merge ratio in such a manner that the ratio of the input image depth distribution feature information increases with an increase in the amount of pixel information difference between the pixel of interest and the corresponding pixel. Upon completion of step ST3, processing proceeds to step ST4.

In step ST4, the image processing device generates the merged depth distribution feature information. The information merge section 261 in the image processing device 20 generates the merged depth distribution feature information by merging, at the merge ratio set in step ST3, the input image depth distribution feature information and the previous image depth distribution feature information, which are generated in step ST2. For example, the information merge section 261 generates, for each depth value, the merged depth histogram by merging the weights of the present depth histogram and previous depth histogram at the merge ratio. Upon completion of step ST4, processing proceeds to step ST5.

In step ST5, the image processing device calculates the representative depth value. The merged information analysis section 262 in the image processing device 20 calculates the representative depth value from the merged depth distribution feature information generated in step ST4. For example, the merged information analysis section 262 calculates the median depth value of the merged depth histogram as the representative depth value. Upon completion of step ST5, processing proceeds to step ST6.

In step ST6, the image processing device determines the depth value of a pixel of interest. The merged information analysis section 262 in the image processing device 20 calculates the reliability of the representative depth value calculated in step ST5, and regards the representative depth value having reliability not lower than the determination threshold value as the depth value of the pixel of interest. For example, the merged information analysis section 262 calculates, as the reliability, the ratio of the total weight of the reliability determination region to the total weight of the whole class width of the merged depth histogram. If the reliability is not lower than the preset determination threshold value, the merged information analysis section 262 regards the representative depth value calculated in step ST5 as the depth value of the pixel of interest. If, by contrast, the reliability is found to be lower than the preset determination threshold value, the merged information analysis section 262 regards the depth value of the pixel of interest as an invalid value.

The image processing device calculates the depth value of a pixel of interest by performing steps ST1 to ST6 for each pixel of interest. It should be noted that processing depicted in FIG. 7 need not always be performed step by step in sequence. An alternative is to perform, for example, pipeline processing or parallel processing.

The first embodiment described above merges the input image depth distribution feature information with the previous image depth distribution feature information to obtain the merged depth distribution feature information, calculates representative depth values from the merged depth distribution feature information, and regards a representative depth value exhibiting higher reliability than the determination threshold value as the depth value of a pixel of interest. Therefore, a highly-reliable depth value is regarded as the depth value of the pixel of interest in accordance with the pixel information and depth value of a pixel in the spatiotemporal direction with respect to the pixel of interest. This improves the spatiotemporal stability of a depth image. If, for example, a shot noise of an imaging element appears in a right viewpoint image or left viewpoint image used for a matching process, an error may occur in the matching process due, for instance, to noise, thereby causing noise indicative of an incorrect depth value for the depth image. In such an instance, the image processing device merges the input image depth distribution feature information with the previous image depth distribution feature information to obtain the merged depth distribution feature information, selects representative depth values from the merged depth distribution feature information, and regards a highly-reliable representative depth value as the depth value. Consequently, the image processing device is capable of eliminating noise from the depth image. As described above, the image processing device performs a spatiotemporal filtering process on the input depth image by using the guide image and the previous depth image. This makes it possible to generate an output depth image that exhibits higher spatiotemporal stability than the input depth image.

Figure 8C:
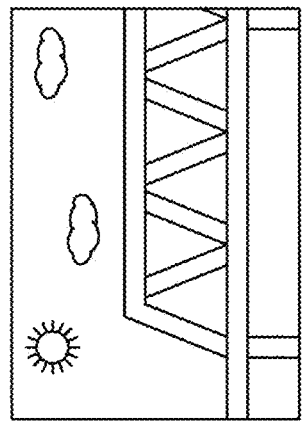
FIGS. 8A, 8B, and 8C depict schematic diagrams illustrating advantages provided by an image processing device.
Figure 8B:
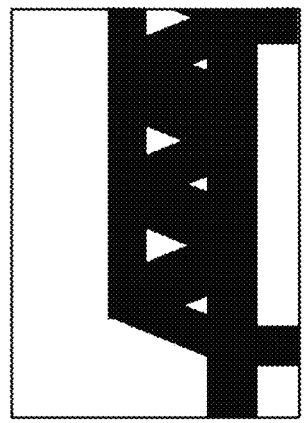
Figure 8A:
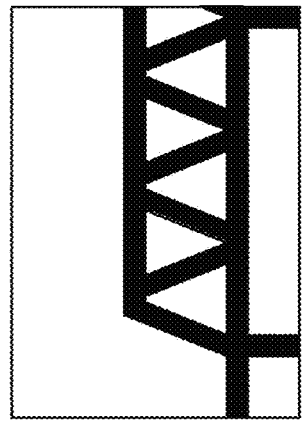

Further, if the window size for the matching process is increased at the time of depth value calculation in a situation where the pixel position for depth value calculation is apart from the outline of a foreground object, images in the windows may coincide with each other so that the depth value of the pixel position for calculation is regarded as the depth value of the foreground object. Therefore, the depth image might be an image showing an expanded outline of the foreground object. However, the image processing device generates the input image depth distribution feature information by using the weight based on the pixel value of a pixel in the input image peripheral region of the input guide image. Further, the image processing device generates the previous image depth distribution feature information by using the weight based on the pixel value of a pixel in the previous image peripheral region of the previous guide image. Therefore, the representative depth value selected from the merged depth distribution feature information is a value obtained in consideration of an image in the peripheral region of the guide image. That is to say, edge shape refinement can be achieved so that pixels showing a background at the boundary of a foreground object do not exhibit the depth value of the foreground object. FIGS. 8A, 8B, and 8C depict schematic diagrams illustrating advantages provided by the image processing device. FIG. 8A depicts a guide image that is inputted to the image processing device. FIG. 8B depicts a depth image that is inputted to the image processing device. FIG. 8C depicts an output depth image that is outputted from the image processing device. The depth image inputted to the image processing device is a depth image showing an expanded outline of the foreground object as compared to the guide image. The image processing device is able to generate an output depth image showing an unexpanded outline of the foreground object by performing the above-described process on the inputted depth image. As described above, the image processing device recursively uses previous images (previous guide image and previous depth image). Therefore, the image processing device is able to perform spatiotemporal filtering over a wide range. It should be noted that the representative depth value need not always be a median depth value. For example, the mode of depth values, which is a depth value at which the depth histogram is maximized, may alternatively be regarded as the representative depth value. Another alternative is to select a statistical value exhibiting the highest reliability from a plurality of statistical values and regard the selected statistical value as the representative depth value.

Further, the image processing device is able to generate the reliability map of the output depth image at the same time. Therefore, the output depth image can be used in accordance with the accuracy required for application. Furthermore, the image processing device recursively uses previous images (previous guide image and previous depth image). Therefore, the image processing device is able to achieve spatiotemporal integration over a wide range while reducing, for example, the amount of computation per unit frame. Moreover, the image processing device generates the output depth image for each pixel of interest by using a pixel of interest, a pixel in the input image peripheral region, and a pixel in the previous image peripheral region. That is to say, the output depth image is generated by performing local processing only. Therefore, parallel computing resources can be effectively used when, for instance, a GPU (Graphics Processing Unit) is implemented.

Further, the image processing device controls the merge ratio between the input image depth distribution feature information and the previous image depth distribution feature information in accordance with the amount of pixel information difference between a pixel of interest in the input guide image and a corresponding pixel in the previous guide image that corresponds to a pixel of interest in the previous guide image. This makes it possible to avoid the shape collapse of an object that has moved in the output depth image.

3. Second Embodiment

The image processing device according to a second embodiment will now be described. The second embodiment will be described by explaining about a case where a depth table is generated as the depth distribution feature information.

The second embodiment has the similar configuration to the first embodiment. Further, in the second embodiment, the input image distribution feature information generation section 212 of the input image information generation processing section 21 and the previous image distribution feature information generation section 242 of the previous image information generation processing section 24 generate the depth table indicative of the relationship between depth value and weight.

For each pixel in the input image peripheral region, the input image distribution feature information generation section 212 generates a present depth table by associating the depth value with the weight calculated by the input image similarity calculation section 211. Further, for each pixel in the previous image peripheral region, the previous image distribution feature information generation section 242 generates a previous depth table by associating the depth value with the weight calculated by the previous image similarity calculation section 241.

FIGS. 9A, 9B, and 9C depict diagrams illustrating operations of the previous image distribution feature information generation section. FIG. 9A illustrates the depth value of a pixel in the previous image peripheral region of the previous depth image. Pixels marked "x" in FIG. 9A have an invalid depth value. FIG. 9B illustrates weights of pixels in the previous image peripheral region that are calculated by the previous image similarity calculation section 241. The previous image distribution feature information generation section 242 excludes pixels having an invalid value from the pixels in the previous image peripheral region, and generates the previous depth table that indicates the relationship between the depth values of the remaining pixels and the weights as depicted in FIG. 9C.

The information merge section 261 of the depth value processing section 26 generates a depth table by regarding the weights of the present depth table and previous depth table as the weights based on the merge ratio set by the merge control section 25. For example, the information merge section 261 multiplies the weight of the previous depth table by the merge ratio $\alpha(n,x)$, and multiplies the weight of the present depth table by the merge ratio $(1-\alpha(n,x))$. The information merge section 261 generates a merged depth table as the merged depth distribution feature information. The merged depth table is generated by combining the present depth table and the previous depth table, which have weights based on the merge ratio.

The merged information analysis section 262 calculates the representative depth value from the merged depth table, regards the representative depth value having reliability not lower than a preset determination threshold value as the depth value of a pixel of interest, and regards the representative depth value having reliability lower than the determination threshold value as an invalid value.

FIGS. 10A, 10B, and 10C depict diagrams illustrating operations of the depth value processing section. FIG. 10A illustrates the present depth table. FIG. 10B illustrates the previous depth table. FIG. 10C illustrates the merged depth table. Further, in the present depth table and the previous depth table, for example, the weight at a merge ratio $\alpha(n,x)$ of 0.2 is indicated as a merge ratio portion. Furthermore, the mark "x" in FIGS. 10A, 10B, and 10C indicates that the depth value is an invalid value.

The depth value processing section 26 excludes the invalid values, and generates the merged depth table by combining the present depth table and the previous depth table. Further, in order to determine the median depth value, the depth value processing section 26 rearranges data, for example, in the order of the depth values. FIG. 10C depicts the merged depth table in which the data is rearranged in the order of the depth values. The depth value processing section 26 calculates the accumulated weight value, for example, in the order of increasing depth values.

Here, the accumulated weight value is 8.36. Thus, the median depth value Dmedian(n,x) is 96. Further, if a region setting width Dthr is 2, the reliability determination region is 94 to 98, and the total value of the reliability determination region Wsum_around_med(n,x) is 6.16. The total weight of the whole class width Wtotal(n,x), which is determined by adding the total invalid value weight "0.2" to the accumulated weight value "8.9," is 9.1. The reliability Dconfidence (n,x) is Wsum_around_med/Wtotal≈0.67. Moreover, if the determination threshold value Thhist_ratio is 0.5, the depth value of a pixel of interest is 96 because the reliability Dconfidence(n,x) is greater than the determination threshold value Thhist_ratio.

The second embodiment described above not only provides the similar advantages to the first embodiment, but also facilitates, for example, the calculation of the representative depth value because the depth tables are used instead of the depth histograms.

4. Third Embodiment

The image processing device according to a third embodiment will now be described. The third embodiment will be described by explaining about a case where the reliability of a previous depth image is used to generate the previous image depth distribution feature information.

The third embodiment includes a previous reliability map storage section 28 in addition to the elements included in the first embodiment.

FIG. 11 illustrates a configuration of the third embodiment. In FIG. 11, elements identical with those of the first embodiment are designated by the same reference numerals as those of the first embodiment. In the third embodiment, the image processing device 20 includes the input image information generation processing section 21, the previous guide image storage section 22, the previous image information generation processing section 24, the merge control section 25, the depth value processing section 26, and the previous depth image storage section 27. Further, the image processing device 20 includes the previous reliability map storage section 28.

For each pixel of interest, the input image information generation processing section 21 generates the input image depth distribution feature information in accordance with the pixel value and depth value of a pixel in the input image peripheral region by using the input guide image and the input depth image.

The previous guide image storage section 22 stores the previous guide image (e.g., a guide image one frame earlier). Further, the previous guide image storage section 22 outputs the stored previous guide image to the previous image information generation processing section 24 and the merge control section 25.

For each pixel of interest, the previous image information generation processing section 24 generates the previous image depth distribution feature information in accordance with the pixel value of a pixel of interest, the pixel value and depth value of a pixel in the previous image peripheral region, and the reliability with respect to the previous image peripheral region. The previous image information generation processing section 24 includes a previous image similarity calculation section 241 and a previous image distribution feature information generation section 242a.

For each pixel of interest, the previous image similarity calculation section 241 calculates a weight based on pixel information similarity between the pixel of interest in the input guide image and pixels in the previous image peripheral region in the previous guide image, and causes the weight to increase with an increase in the pixel information similarity. For example, the previous image similarity calculation section 241 uses the luminance value of the pixel of interest and the luminance value of the pixels in the previous image peripheral region to calculate the weight Wprevious (n,x,x') in accordance with Equation (4) above.

The previous image distribution feature information generation section 242a generates the previous image depth distribution feature information by associating the depth value and reliability of a pixel in the previous image peripheral region with the weight determined by the previous image similarity calculation section 241. The previous image depth distribution feature information indicates the relationship between a depth value in the previous image peripheral region and a weight based on reliability. For example, the previous image distribution feature information generation section 242a generates the previous depth histogram Hprevious(n,x,d) in accordance with Equation (14). In Equation (14), Dconfidence(n−1,x') is the reliability of a pixel at a position "x'" in the previous image peripheral region, Dfilterted (n−1,x') is the depth value of the pixel at the position "x'," and d (e.g., 0≤d≤255) is an integer value indicative of the depth value. Further, the previous image peripheral region for the pixel of interest x is specified by the local window function W(x), and the previous depth histogram is generated by using the weight, the reliability, and the depth value of a pixel in a region indicated by the local window function W(x). It should be noted that the integer value d indicative of the depth value is equivalent to classes (bins) of the previous depth histogram. Weights of peripheral pixels for which the integer value d is equal to the depth value are added together in accordance with Equation (15). The resulting value is regarded as a frequency with respect to the integer value d. As for the reliability, the reliability map stored in the previous reliability map storage section 28 is used.

[Math. 11]

$$H_{previous}(n, x, d) =$$
$$\sum_{x' \in W(x)} D_{confidence}(n-1, x') w_{previous}(n, x, x') \delta(D_{filtered}(n-1, x') - d) \quad (14)$$

$$\delta(m) = \begin{cases} 1 & \text{if } m = 0 \\ 0 & \text{if } m \text{ is other than } 0 \end{cases} \quad (15)$$

The merge control section 25 sets the merge ratio in accordance with the amount of pixel information difference between a pixel of interest in the input guide image and a corresponding pixel in a previous image, and outputs the merge ratio to the depth value processing section 26.

The depth value processing section 26 merges, at the merge ratio set by the merge control section 25, the input image depth distribution feature information generated by the input image information generation processing section 21 with the previous image depth distribution feature information generated by the previous image information generation processing section 24. Further, the depth value processing section 26 calculates the representative depth value in accordance with the merged depth distribution feature information. Furthermore, if the reliability of the representative depth value is not lower than a determination threshold value, the depth value processing section 26 regards the representative depth value as the depth value of the pixel of interest. Moreover, the depth value processing section 26 causes the previous depth image storage section 27 to store an output depth image indicative of a depth value calculated for each pixel of interest as the previous depth image. Additionally, the depth value processing section 26 causes the previous reliability map storage section 28 to store the reliability map indicative of reliability calculated for each pixel of interest as the reliability map corresponding to the previous depth image stored in the previous depth image storage section 27.

Further, in the third embodiment, processing is performed for each pixel of interest in the similar manner as depicted in the flowchart of FIG. 7, and the previous image depth distribution feature information is generated in step ST2 in accordance with the depth value, reliability, and weight of a pixel in the previous image peripheral region.

As the third embodiment is configured as described above, it provides the similar advantages to the first embodiment. Further, in the third embodiment, the reliability map corresponding to the previous depth image is reflected in the previous image depth distribution feature information. Therefore, more appropriate depth values are obtained than in a case where the reliability map is not used. Moreover, the accuracy of the reliability map, which is outputted simultaneously with the output depth image, is expected to improve.

5. Fourth Embodiment

Incidentally, an image of an object is captured with the viewpoint moved in some cases. In view of such circumstances, a fourth embodiment improves the spatiotemporal stability of a depth image even in a case where the viewpoint moves. In the fourth embodiment, the image processing device performs a viewpoint conversion process of converting at least either one of the input image (input guide image and input depth image) and the previous image (previous guide image and previous depth image) to an image that coincides in viewpoint with the other image. Further, the image processing device uses the input image and the previous image that coincide with each other in viewpoint, and generates the output depth image by performing the similar process to in one of the first to third embodiments. The following describes a case where a viewpoint conversion processing section for causing the viewpoint of the previous image to coincide with the viewpoint of the input image is added to the elements of the first embodiment.

FIG. 12 illustrates a configuration of the fourth embodiment. In FIG. 12, elements identical with those of the first embodiment are designated by the same reference numerals as those of the first embodiment. The image processing device 20 includes the input image information generation processing section 21, the previous guide image storage section 22, the previous image information generation processing section 24, the merge control section 25, the depth value processing section 26, and the previous depth image storage section 27. Further, the image processing device 20 according to the fourth embodiment includes a viewpoint conversion processing section 23.

The input image information generation processing section 21 generates the input image depth distribution feature information in accordance with the pixel value and depth value of a pixel in the input image peripheral region.

The previous guide image storage section 22 stores a previous guide image that is earlier than the input guide image. Further, the previous guide image storage section 22 outputs the stored previous guide image to the viewpoint conversion processing section 23.

The viewpoint conversion processing section 23 converts the previous guide image outputted from the previous guide image storage section 22 to an image at the viewpoint of the input image. Further, the viewpoint conversion processing section 23 converts the previous depth image stored in the previous depth image storage section 27 to a depth image at the viewpoint of the input image.

The viewpoint conversion processing section 23 includes a position/posture detection section 231, a previous position/posture storage section 232, a viewpoint conversion parameter generation section 233, a guide image viewpoint conversion section 234, and a depth image viewpoint conversion section 235.

The position/posture detection section 231 detects the position and posture of an imaging device that has generated a guide image in accordance with the input guide image. The position/posture detection section 231 uses a method disclosed, for example, in Davison, Andrew J. "Real-time simultaneous localisation and mapping with a single camera," Computer Vision, 2003, Proceedings, Ninth IEEE International Conference on IEEE 2003, to detect the position and posture of the imaging device that has generated the input guide image, and outputs the result of detection to the previous position/posture storage section 232 and the viewpoint conversion parameter generation section 233.

The previous position/posture storage section 232 stores the detection result outputted from the position/posture detection section 231. Further, the previous position/posture storage section 232 outputs the stored detection result, that is, the detection result based on the previous guide image, to the viewpoint conversion parameter generation section 233.

The viewpoint conversion parameter generation section 233 generates a viewpoint conversion parameter. The viewpoint conversion parameter is used to perform a viewpoint conversion process of causing the previous guide image and the previous depth image to coincide in viewpoint with the input image. The viewpoint conversion parameter generation section 233 outputs the generated viewpoint conversion parameter to the guide image viewpoint conversion section 234 and the depth image viewpoint conversion section 235.

Figures 13A, 13B, 13C:
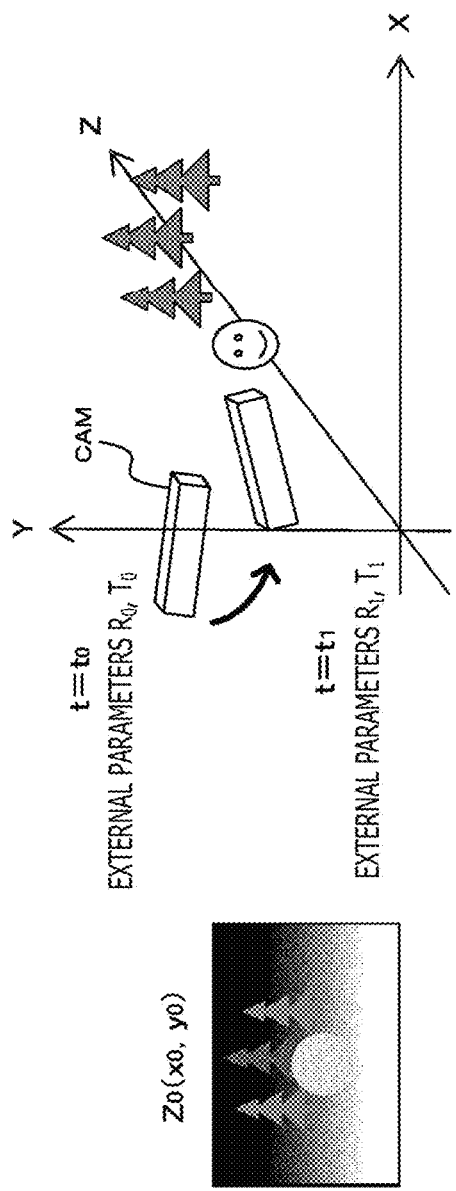
FIGS. 13A, 13B, and 13C depict diagrams illustrating viewpoint conversion.

FIGS. 13A, 13B, and 13C depict diagrams illustrating viewpoint conversion. FIG. 13A depicts a two-dimensional depth image that is not subjected to viewpoint conversion. FIG. 13B depicts the movement of the imaging device. FIG. 13C depicts a two-dimensional depth image that is subjected to viewpoint conversion. FIGS. 13A, 13B, and 13C illustrate a case where the imaging device CAM (viewpoint) is moved during a period between time point t0 and time point t1, and a depth image at time point t0 (previous depth image) is converted to a depth image at a viewpoint at time point t1 (the viewpoint of an input depth image).

A point Z0(x0,y0) of the two-dimensional depth image at time point t0 can be converted to a three-dimensional point (X0,Y0,Z0) in accordance with Equations (16) and (17). Z0 is a depth value at a position (x0,y0), f is a focal length, and Cx, Cy is the center of an image.

[Math. 12]

$$X_0 = \frac{x_0 - c_x}{f} Z_0 \tag{16}$$

$$Y_0 = \frac{y_0 - c_y}{f} Z_0 \tag{17}$$

The three-dimensional point (X0,Y0,Z0) at time point t0 can be converted to a three-dimensional point (X1,Y1,Z1) at time point t1 in accordance with Equation (18) by using external parameters R0, T0 before viewpoint movement and external parameters R1, T1 after viewpoint movement. It should be noted that the external parameters R0, R1 are viewpoint rotation parameters, and that the external parameters T0, T1 are viewpoint translation parameters.

[Math. 13]

$$\begin{pmatrix} X_1 \\ Y_1 \\ Z_1 \end{pmatrix} = R_1 R_0^{-1} \begin{pmatrix} X_0 \\ Y_0 \\ Z_0 \end{pmatrix} - R_1 R_0^{-1} T_0 + T_1 \tag{18}$$

Further, the three-dimensional point (X1,Y1,Z1) at time point t1 can be converted to a point Z1(x1,y1) of a two-dimensional depth image at time point t1 in accordance with Equations (19) and (20). It should be noted that Z1 is the depth value of a position (x1,y1).

[Math. 14]

$$x_1 = f \frac{X_1}{Z_1} + c_x \tag{19}$$

$$y_1 = f \frac{Y_1}{Z_1} + c_y \tag{20}$$

In the manner described above, the depth image at time point t0 can be converted to a depth image at the viewpoint of time point t1. Therefore, in accordance with the previously-acquired focal length f, the detection result (corresponding to the external parameters R1, T1 after viewpoint movement) outputted from the position/posture detection section 231, and the detection result (corresponding to the external parameters R0, T0 before viewpoint movement) stored in the previous position/posture storage section 232, the viewpoint conversion parameter generation section 233 generates the viewpoint conversion parameter that converts the point Z0(x0,y0) of the two-dimensional depth image to the point Z1(x1,y1).

The guide image viewpoint conversion section 234 performs viewpoint conversion by using a conversion parameter in order to convert the previous guide image stored in the previous guide image storage section 22 to a guide image at a viewpoint equal to that of the input guide image, and outputs the resulting guide image to the previous image information generation processing section 24.

The depth image viewpoint conversion section 235 performs viewpoint conversion by using a conversion parameter in order to convert the previous depth image stored in the previous depth image storage section 27 to a depth image at a viewpoint equal to that of the input depth image, and outputs the resulting depth image to the previous image information generation processing section 24.

In accordance with the pixel value of a pixel of interest and the pixel value, depth value, and weight of a pixel in the previous image peripheral region, the previous image information generation processing section 24 generates the previous image depth distribution feature information with respect to the pixel of interest by using the previous guide image and previous depth image subjected to viewpoint conversion.

The merge control section 25 sets the merge ratio in accordance with the amount of pixel information difference between a pixel of interest in the input guide image and a corresponding pixel in the previous guide image subjected to viewpoint conversion, and outputs the merge ratio to the depth value processing section 26.

The depth value processing section 26 merges, at the merge ratio set by the merge control section 25, the input image depth distribution feature information generated by the input image information generation processing section 21 with the previous image depth distribution feature information generated by the previous image information generation processing section 24. Further, the depth value processing section 26 calculates the representative depth value in accordance with the merged depth distribution feature information. Furthermore, if the reliability of the representative depth value is not lower than a determination threshold value, the depth value processing section 26 regards the representative depth value as the depth value of the pixel of interest. Moreover, the depth value processing section 26 causes the previous depth image storage section 27 to store an output depth image indicative of a depth value calculated for each pixel of interest as the previous depth image. Additionally, the depth value processing section 26 causes the previous reliability map storage section 28 to store the reliability map indicative of the calculated reliability.

Figure 14:
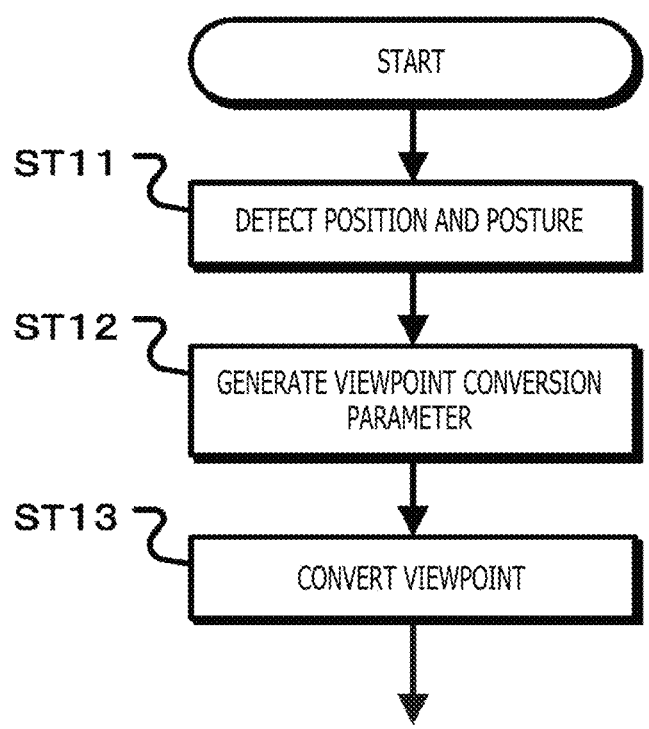
FIG. 14 is a flowchart illustrating a viewpoint conversion operation.

FIG. 14 is a flowchart illustrating a viewpoint conversion operation. In step ST11, the image processing device performs position/posture detection. In accordance with the input image, the viewpoint conversion processing section 23 in the image processing device 20 detects the position and posture of an imaging device that has generated the input image. Upon completion of step ST11, processing proceeds to step ST12.

In step ST12, the image processing device generates a viewpoint conversion parameter. In accordance with the result of position and posture detection in step ST11 and with a position/posture detection result derived from the calculation based on the previous guide image, the viewpoint conversion processing section 23 generates a viewpoint conversion parameter that causes the input image and the previous image to coincide in viewpoint. Upon completion of step ST12, processing proceeds to step ST13.

In step ST13, the image processing device performs viewpoint conversion. The viewpoint conversion processing section 23 performs viewpoint conversion by using the viewpoint conversion parameter generated in step ST12, and causes the input image and the previous image to coincide in viewpoint in accordance with the result of detection and with the position/posture detection result derived from the calculation based on the previous guide image.

The image processing device causes the input image and the previous image to coincide in viewpoint by performing the viewpoint conversion operation illustrated in FIG. 14, and then generates an output depth image having improved spatiotemporal stability by performing the process depicted in the flowchart of FIG. 7 for each of pixels of interest that are sequentially set with respect to the input image. Further, each time a new image is inputted, the image processing device performs the process depicted in the flowchart of FIG. 14 and the process depicted in the flowchart of FIG. 7.

Figure 15:
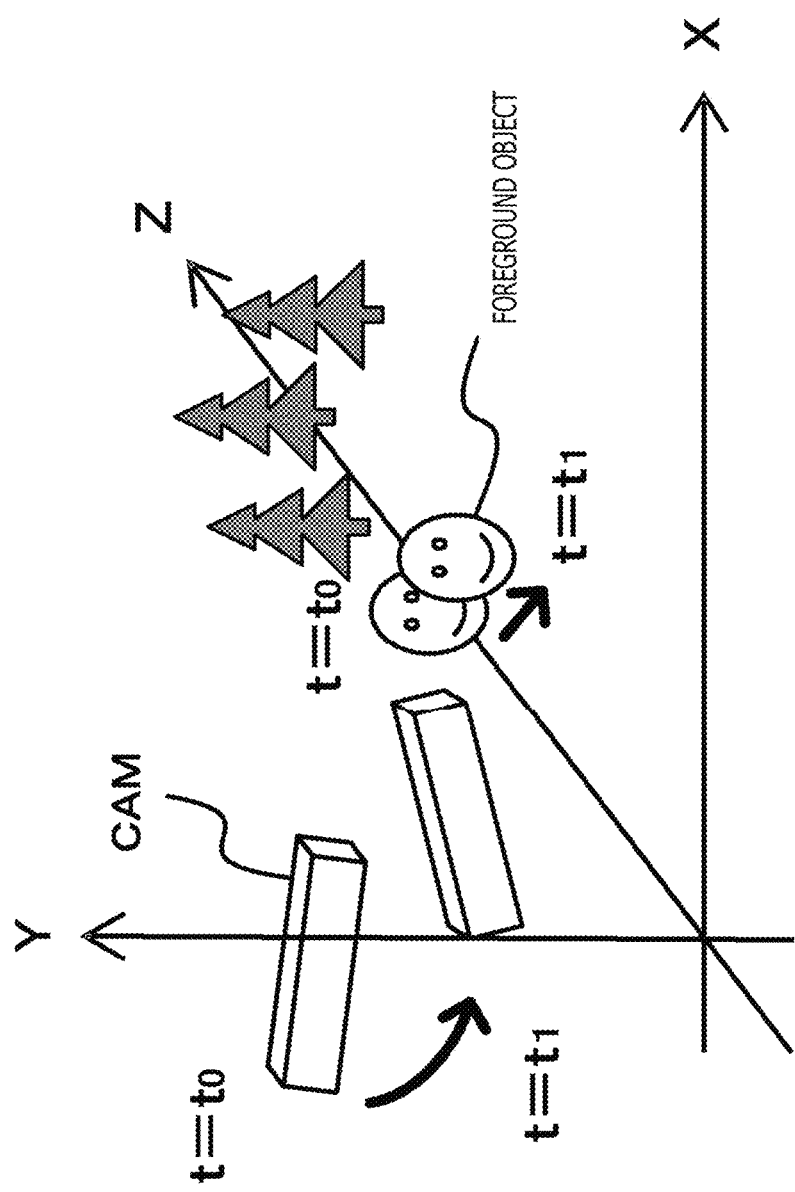
FIG. 15 is a diagram illustrating the movements of a viewpoint and a foreground object.

FIG. 15 illustrates the movements of a viewpoint and a foreground object. FIG. 16 illustrates operations of the fourth embodiment that are performed when the viewpoint and the foreground object have moved as depicted in FIG. 15.

Referring to FIG. 14, the imaging device CAM (viewpoint) and the foreground object are moved during a period between time point t0 and time point t1.

FIG. 15 illustrates a case where spatiotemporal stability is to be improved with respect to the input image at time point t1. In this case, a guide image at time point t0 is stored in the previous guide image storage section as the previous guide image. Further, an output depth image generated by performing a process of improving spatiotemporal stability with respect to a depth image at time point t0 is stored in the previous depth image storage section as the previous depth image. Furthermore, the result of position and posture detection of an imaging device that has generated a guide image in accordance with a guide image at time point t0 is stored in the viewpoint conversion processing section. It should be noted that the blocks depicted in FIG. 15 are designated by the same reference numerals as the blocks depicted in FIG. 12 and adapted to perform corresponding processes.

In accordance with a guide image at time point t1, a position/posture detection process detects the position and posture of an imaging device that has generated a guide image. In accordance with the result of position and posture detection based on a guide image at time point t0 and with the result of position and posture detection based on a guide image at time point t1, a posture conversion parameter generation process generates a viewpoint conversion parameter that converts the previous guide image and the previous depth image to images having the viewpoints of the guide image and depth image at time point t1.

The viewpoint conversion process uses the viewpoint conversion parameter to perform viewpoint conversion of the previous guide image and previous depth image and generate a previous guide image and a previous depth image that have viewpoints of the guide image and depth image at time point t1.

For each pixel of interest, a merge control process calculates a weight in accordance with the amount of pixel information difference by using the guide image at time point t1 and the previous guide image subjected to viewpoint conversion. It should be noted that FIG. 15 depicts the result of difference amount detection, and that a black region is a pixel region where pixel information difference is encountered, and further that the other region is a pixel region where pixel information coincidence is achieved.

A depth image spatiotemporal integration process merges the input image depth distribution feature information with the previous image depth distribution feature information at the merge ratio set by the merge control section, calculates the representative depth value from the merged depth distribution feature information, and generates an output depth image by handling the calculated representative depth value as the depth value of a pixel of interest.

As the fourth embodiment is as described above, it provides the similar advantages to the first embodiment. Further, even when the viewpoint changes, the fourth embodiment is able to improve the spatiotemporal stability of a depth image. Therefore, applications where an imaging device is mounted in a mobile device (e.g., a mobile terminal such as a smartphone or a feature phone) or a wearable device (e.g., a head-mounted display) can be supported by compensating for inter-frame changes in the position and posture of the imaging device.

A series of processes described in this document can be performed by hardware, software, or a combination of both. In a case where the processes are to be performed by software, it is possible to install a program, in which a processing sequence is recorded, in a memory of a computer incorporated in dedicated hardware and then execute the program, or install the program in a general-purpose computer capable of performing various processes and then execute the program.

For example, the program can be prerecorded on a hard disk or an SSD (Solid State Drive), which are used as a recording medium, or in a ROM (Read Only Memory). Alternatively, the program can be stored (recorded) temporarily or permanently on a flexible disk, a CD-ROM (Compact Disc Read Only Memory), an MO (Magneto optical) disk, a DVD (Digital Versatile Disc), a BD (Blu-Ray Disc (registered trademark)), a magnetic disk, a semiconductor memory, or other removable recording medium. Such a removable recording medium can be supplied as package software.

As an alternative to the method of installing the program on a computer from a removable recording medium, the program may be transferred from a download site to the computer in a wireless or wired manner via a network such as a LAN (Local Area Network) or the Internet. In such an instance, the computer can receive the transferred program and install it on a built-in hard disk or other recording medium.

The advantages described in this document are merely illustrative and not restrictive. The present technology is not limited to the described advantages and can provide additional advantages. The interpretation of the present technology is not limited to those described in conjunction with the foregoing embodiments. The embodiments of the present technology disclose the present technology in an illustrative manner. It is to be understood that the embodiments may be modified or changed by those skilled in the art without departing from the spirit and scope of the present technology. That is to say, the spirit of the present technology should be determined in consideration of the appended claims.

Further, the image processing device according to the present technology may adopt the following configurations.

(1) An image processing device including:

a depth value processing section that merges input image depth distribution feature information with previous image depth distribution feature information in order to generate merged depth distribution feature information, calculates a representative depth value from the merged depth distribution feature information, and regards the calculated representative depth value as a depth value of a pixel of interest of an input image, the input image depth distribution feature information being based on the pixel value and depth value of pixels in a peripheral region with respect to the pixel of interest, the previous image depth distribution feature information being based on the pixel value of the pixel of interest and the pixel value and depth value of pixels in a peripheral region with respect to a pixel corresponding to the pixel position of the pixel of interest in a previous image, the previous image being an image earlier than the input image.

(2) The image processing device as described in (1) further including:

an input image information generation processing section that generates the input image depth distribution feature information; and a previous image information generation processing section that generates the previous image depth distribution feature information, in which the input image information generation processing section generates, for each pixel in the peripheral region, the input image depth distribution feature information by associating the depth value with a weight based on the similarity of pixel information to the pixel of interest, and the previous image information generation processing section generates, for each pixel in the peripheral region with respect to the corresponding pixel, the previous image depth distribution feature information by associating the depth value with a weight based on the similarity of the pixel information to the pixel of interest.

(3) The image processing device as described in (2) further including:

a merge control section that sets a merge ratio in accordance with the amount of pixel information difference between the pixel of interest and the corresponding pixel, in which the depth value processing section merges the input image depth distribution feature information with the previous image depth distribution feature information at the merge ratio set by the merge control section.

(4) The image processing device as described in (3), in which the merge control section causes the merge ratio for the input image depth distribution feature information generated by the input image information generation processing section to increase with an increase in the amount of pixel information difference between the pixel of interest and the corresponding pixel.

(5) The image processing device as described in (3) or (4), in which the pixel information includes information regarding luminance or color.

(6) The image processing device as described in any one of (2) to (5), in which the input image information generation processing section and the previous image information generation processing section cause the weight to increase with an increase in the similarity of the pixel information to the pixel of interest.

(7) The image processing device as described in any one of (2) to (6), in which, if the reliability of the representative depth value that is calculated by the depth value processing section is not lower than a preset determination threshold value, the depth value processing section regards the representative depth value as the depth value of the pixel of interest.

(8) The image processing device as described in (7), in which the depth value processing section regards, as the reliability, the ratio of total weight in a predetermined depth range based on the representative depth value to the total weight of the merged depth distribution feature information.

(9) The image processing device as described in (7) or (8), in which, if the reliability is lower than the preset determination threshold value, the depth value processing section regards the depth value of the pixel of interest as an invalid value, and the previous image information generation processing section generates the previous image depth distribution feature information by excluding pixels indicative of the invalid value from pixels in the peripheral region with respect to the corresponding pixel.

(10) The image processing device as described in any one of (7) to (9), in which the depth value processing section is able to change the determination threshold value.

(11) The image processing device as described in any one of (2) to (10), in which the depth value processing section regards the merged depth distribution feature information as depth value order information, and handles a depth value having a median accumulated weight value as the representative depth value.

(12) The image processing device as described in any one of (2) to (11), in which the input image information generation processing section generates, as the depth distribution feature information, a depth histogram obtained by accumulating the weight of each depth value in accordance with the depth value and weight of pixels in the peripheral region with respect to the pixel of interest, the previous image information generation processing section generates, as the previous image depth distribution feature information, a depth histogram obtained by accumulating the weight of each depth value in accordance with the depth value and weight of pixels in the peripheral region with respect to the corresponding pixel, and the depth value processing section merges histograms generated by the input image information generation processing section and the previous image information generation processing section by regarding the weights of the histograms as weights based on the merge ratio set by the merge control section and regards the merged depth histogram as the merged depth distribution feature information.

(13) The image processing device as described in any one of (2) to (11), in which the input image information generation processing section generates, as the depth distribution feature information, a depth table indicative of the weight of each depth value in accordance with the depth value and weight of pixels in the peripheral region with respect to the pixel of interest, the previous image information generation processing section generates, as the depth distribution feature information, a depth table indicative of the weight of each depth value in accordance with the depth value and weight of pixels in a previous image peripheral region with respect to the corresponding pixel, and the depth value processing section merges depth tables generated by the input image information generation processing section and the previous image information generation processing section by regarding the weights of the depth tables as weights based on the merge ratio set by the merge control section and regards the merged depth table as the merged depth distribution feature information.

(14) The image processing device as described in any one of (2) to (13), in which the depth value processing section regards, as the reliability of the pixel of interest, the reliability calculated of the representative depth value handled as the depth value of the pixel of interest, and the previous image information generation processing section generates the previous image depth distribution feature information in accordance with the pixel value of the pixel of interest and the pixel value, depth value, and reliability of pixels in the peripheral region with respect to the corresponding pixel.

(15) The image processing device as described in any one of (2) to (14), further including:

a viewpoint conversion processing section that converts at least either one of the input image and the previous image to an image that coincides in viewpoint with the other image, in which the input image information generation processing section and the previous image information generation processing section generate the input image depth distribution feature information and the previous image depth distribution feature information by using the images having the same viewpoint as a result of the conversion by the viewpoint conversion processing section.

INDUSTRIAL APPLICABILITY

The image processing device according to the present technology provides a highly-reliable depth value as the depth value of a pixel of interest in accordance with pixel information and depth value of a pixel in a spatiotemporal direction with respect to an image of interest. This makes it possible to improve the spatiotemporal stability of a depth image. Consequently, the image processing device is usable in applications where depth images having spatiotemporal stability are required, that is, applicable to electronic devices (e.g., mobile devices and wearable devices) that can be used, for example, for three-dimensional user interface and SLAM (simultaneous localization and mapping).

REFERENCE SIGNS LIST

10 . . . Depth image system
15 . . . Depth image generation device
20 . . . Image processing device
21 . . . Input image information generation processing section
22 . . . Previous guide image storage section
23 . . . Viewpoint conversion processing section
24 . . . Previous image information generation processing section
25 . . . Merge control section
26 . . . Depth value processing section
27 . . . Previous depth image storage section
28 . . . Previous reliability map storage section
211 . . . Input image similarity calculation section
212 . . . Input image distribution feature information generation section
231 . . . Position/posture detection section
232 . . . Previous position/posture storage section
233 . . . Viewpoint conversion parameter generation section
234 . . . Guide image viewpoint conversion section
235 . . . Depth image viewpoint conversion section
241 . . . Previous image similarity calculation section
242, 242a . . . Previous image distribution feature information generation section
251 . . . Difference amount calculation section
252 . . . Merge ratio setting section
261 . . . Information merge section
262 . . . Merged information analysis section

The invention claimed is:

1. An image processing device, comprising:
an input image information generation processing section configured to generate input image depth distribution feature information from an input image based on first pixel values and first depth values of first pixels in a first peripheral region of the input image with respect to a pixel of interest of the input image;
a previous image information generation processing section configured to generate previous image depth distribution feature information from a previous image generated before the input image, wherein the previous image depth distribution feature information is generated based on a pixel value of the pixel of interest and second pixel values and second depth values of second pixels in a second peripheral region of the previous image with respect to a previous pixel that corresponds to the pixel of interest; and
a depth value processing section configured to:
merge the input image depth distribution feature information with the previous image depth distribution feature information to generate merged depth distribution feature information;
calculate a representative depth value from the merged depth distribution feature information;
determine that a reliability of the representative depth value is not lower than a preset determination threshold value; and
regard the calculated representative depth value as a depth value of the pixel of interest based on the determination that the reliability of the representative depth value is not lower than the preset determination threshold value.

2. The image processing device according to claim 1, wherein
the input image information generation processing section is further configured to generate, for each pixel of the first pixels in the first peripheral region, the input image depth distribution feature information based on association of the first depth values with a first weight,
the first weight is based on a similarity of pixel information of the each pixel of the first pixels in the first peripheral region to that of the pixel of interest,
the previous image information generation processing section is further configured to generate, for each pixel of the second pixels in the second peripheral region with respect to the previous pixel, the previous image depth distribution feature information based on association of the second depth values with a second weight, and
the second weight is based on a similarity of the pixel information of the each pixel of the second pixels in the second peripheral region to that of the pixel of interest.

3. The image processing device according to claim 2, further comprising:
a merge control section configured to set a merge ratio based on an amount of pixel information difference between the pixel of interest and a corresponding pixel, wherein the depth value processing section is further configured to merge the input image depth distribution feature information with the previous image depth distribution feature information at the set merge ratio.

4. The image processing device according to claim 3, wherein the merge control section is further configured to increase the merge ratio for the input image depth distribution feature information with an increase in the amount of pixel information difference between the pixel of interest and the corresponding pixel.

5. The image processing device according to claim 3, wherein the pixel information includes information associated with luminance or color.

6. The image processing device according to claim 2, wherein
the input image information generation processing section is further configured to increase the first weight with an increase in the similarity of the pixel information of the each pixel of the first pixels in the first peripheral region to that of the pixel of interest, and
the previous image information generation processing section is further configured increase the second weight with an increase in the similarity of the pixel information of the each pixel of the second pixels in the second peripheral region to that of the pixel of interest.

7. The image processing device according to claim 2, wherein the depth value processing section is further configured to regard, as the reliability, a ratio of a total weight in a specific depth range based on the representative depth value to a total weight of the merged depth distribution feature information.

8. The image processing device according to claim 2, wherein
the depth value processing section is further configured to regard the depth value of the pixel of interest as an invalid value based on the reliability of the representative depth value being lower than the preset determination threshold value, and
the previous image information generation processing section is further configured to generate the previous image depth distribution feature information by exclusion of pixels indicative of the invalid value from the second pixels.

9. The image processing device according to claim 2, wherein the depth value processing section is further configured to change the preset determination threshold value.

10. The image processing device according to claim 2, wherein the depth value processing section is further configured to:
regard the merged depth distribution feature information as depth value order information; and
set a depth value having a median accumulated weight value as the representative depth value.

11. The image processing device according to claim 2, wherein
the input image information generation processing section is further configured to:
accumulate the first weight of each depth value of the first depth values;
obtain a first depth histogram based on the accumulation of the first weight;
generate the first depth histogram as the depth distribution feature information,
the previous image information generation processing section is further configured to:
accumulate the second weight of each depth value of the second depth values;
obtain a second depth histogram based on the accumulation of the second weight;
generate the second depth histogram as the previous image depth distribution feature information, and
the depth value processing section is further configured to:
merge the first depth histogram and the second depth histogram based on the set merge ratio and weights of the first depth histogram and the second depth histogram; and
regard the merged first depth histogram and the second depth histogram as the merged depth distribution feature information.

12. The image processing device according to claim 2, wherein
the input image information generation processing section is further configured to generate, as the depth distribution feature information, a first depth table,
the first depth table indicates the first weight of each depth value of the first depth values,
the previous image information generation processing section is further configured to generate, as the depth distribution feature information, a second depth table,
the second depth table indicates the second weight of each depth value of the second depth values, and
the depth value processing section is further configured to:
merge the first depth table and the second depth table based on the set merge ratio and weight of the first depth table and the second depth table; and
regard the merged first depth table and the second depth table as the merged depth distribution feature information.

13. The image processing device according to claim 2, wherein
the depth value processing section is further configured to regard, as the reliability of the pixel of interest, the determined reliability of the representative depth value handled as the depth value of the pixel of interest, and
the previous image information generation processing section is further configured to generate the previous image depth distribution feature information based on the pixel value of the pixel of interest and the pixel value, depth value, and reliability of the first pixels.

14. The image processing device according to claim 2, further comprising:
a viewpoint conversion processing section is configured to convert at least a first image of the input image or the previous image to an image that coincides in viewpoint with a second image of the input image or the previous image, wherein
the input image information generation processing section is further configured to generate the input image depth distribution feature information based on the first image and the second image,
the previous image information generation processing section is further configured to generate the previous image depth distribution feature information based on the first image and the second image, and
the first image and the second image include a same viewpoint as a result of the conversion.

15. An image processing method, comprising:
generating input image depth distribution feature information from an input image based on first pixel values and first depth values of first pixels in a first peripheral region of the input image with respect to a pixel of interest of the input image;

generating previous image depth distribution feature information from a previous image generated before the input image, wherein the previous image depth distribution feature information is generated based on a pixel value of the pixel of interest and second pixel values and second depth values of second pixels in a second peripheral region of the previous image with respect to a previous pixel that corresponds to the pixel of interest;

merging the input image depth distribution feature information with the previous image depth distribution feature information to generate merged depth distribution feature information;

calculating a representative depth value from the merged depth distribution feature information;

determining that a reliability of the representative depth value is not lower than a preset determination threshold value; and regarding the calculated representative depth value as a depth value of the pixel of interest based on the determination that the reliability of the representative depth value is not lower than the preset determination threshold value.

\* \* \* \* \*